US009965865B1

(12) United States Patent
Agrawal et al.

(10) Patent No.: US 9,965,865 B1
(45) Date of Patent: May 8, 2018

(54) IMAGE DATA SEGMENTATION USING DEPTH DATA

(71) Applicant: Amazon Technologies, Inc., Seattle, WA (US)

(72) Inventors: Amit Kumar Agrawal, Santa Clara, CA (US); Abhishek Singh, Mountain View, CA (US); Visesh Uday Kumar Chari, San Francisco, CA (US); Prakash Ramu, San Mateo, CA (US); Lelin Zhang, San Jose, CA (US); Qiang Liu, Cupertino, CA (US); Yadunandana Nagaraja Rao, Sunnyvale, CA (US); Rohith Mysore Vijaya Kumar, Sunnyvale, CA (US); Weijian Wang, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 15/473,334

(22) Filed: Mar. 29, 2017

(51) Int. Cl.
*G06T 7/194* (2017.01)
*H04N 13/02* (2006.01)
*G06K 9/62* (2006.01)

(52) U.S. Cl.
CPC ........... *G06T 7/194* (2017.01); *G06K 9/6218* (2013.01); *G06K 9/6267* (2013.01); *H04N 13/0203* (2013.01); *G06T 2207/10024* (2013.01); *G06T 2207/10028* (2013.01); *G06T 2207/30196* (2013.01)

(58) Field of Classification Search
CPC ........... G06T 7/194; G06T 2207/30196; G06T 2207/10028; G06T 2207/10024; G06K 9/6218; G06K 9/6267; H04N 13/0203
See application file for complete search history.

(56) References Cited

U.S. PATENT DOCUMENTS

| 2003/0235341 A1* | 12/2003 | Gokturk | G06K 9/00228 382/243 |
| 2015/0063681 A1* | 3/2015 | Bhardwaj | G06F 17/30277 382/154 |

(Continued)

OTHER PUBLICATIONS

Rhemann et al.; A Perceptually Motivated Online Benchmark for Image Matting; Microsoft Research Cambridge PhD Scholarship Program; Jun. 20, 2009; 8 pgs.

(Continued)

*Primary Examiner* — Hung Lam
(74) *Attorney, Agent, or Firm* — K&L Gates LLP

(57) ABSTRACT

Devices and techniques are generally described for segmentation of image data using depth data. In various examples, color image data may be received from a digital camera. In some examples, depth image data may be received from a depth sensor. In various examples, the depth image data may be separated into a plurality of clusters of depth image data, wherein each cluster is associated with a respective range of depth values. In some further examples, a determination may be made that a first cluster of image data corresponds to an object of interest, such as a human subject, in the image data. In various examples, pixels of the first cluster may be encoded with foreground indicator data. In some further examples, segmented image data may be generated. The segmented image data may comprise pixels encoded with the foreground indicator data.

20 Claims, 8 Drawing Sheets

(56) References Cited

U.S. PATENT DOCUMENTS

| | | | | |
|---|---|---|---|---|
| 2015/0206312 A1* | 7/2015 | Luo | ..................... | G06T 7/0081 |
| | | | | 382/173 |
| 2017/0086712 A1* | 3/2017 | Mauro | ................. | A61B 5/1127 |
| 2017/0124717 A1* | 5/2017 | Baruch | .................. | G06T 7/187 |
| 2017/0295355 A1* | 10/2017 | Tanaka | ............... | H04N 13/0022 |

OTHER PUBLICATIONS

Cho et al.; An Introduction to Alpha Matting; Vienna Science and Technology Fund; Dec. 1, 2013; 51 pgs.

Shahrian et al.; Survey of Image Matting; Medical University of Viena; Dec. 1, 2013; 68 pgs.

Price; Challenges and Future Work in Matting; Adobe Research; Feb. 1, 2013; 80 pgs.

Shahrian et al.; Video Matting; Medical University of Viena; Dec. 1, 2013; 26 pgs.

Author Unknown; Alpha Matting Evaluation Website; retrieved on Mar. 28, 2017 from http://www.alphamatting.com; 1 page.

\* cited by examiner

IMAGE DATA SEGMENTATION USING DEPTH DATA

BACKGROUND

Cameras and other image sensors may be used to capture images and/or videos of a physical environment. Often, individuals take digital photographs of themselves and/or of others to memorialize a moment or to share photographs on social networks and/or over the internet. Images may be edited and altered to create desired effects. Image data may be stored and organized to aid in accessibility of particular image.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for processing image content. Image data, as described herein, may refer to stand-alone frames of image data or to multiple frames of sequential image data, appended together to form a video. Image data may be comprised of a plurality of pixels arranged in a two-dimensional grid including an x component representing a horizontal direction in the grid and a y component representing a vertical direction or axis in the grid. A pixel may be the smallest addressable unit of image data in an image. A particular pixel may be identified by an x value, representing the horizontal position of the pixel in the two-dimensional grid and a y value, representing the vertical position of the pixel in the two-dimensional grid. Additionally, as described herein, pixels of image data may include depth data representing a distance between a surface represented by the pixel of image data and the image sensor (e.g., a depth sensor).

Figure 1A:
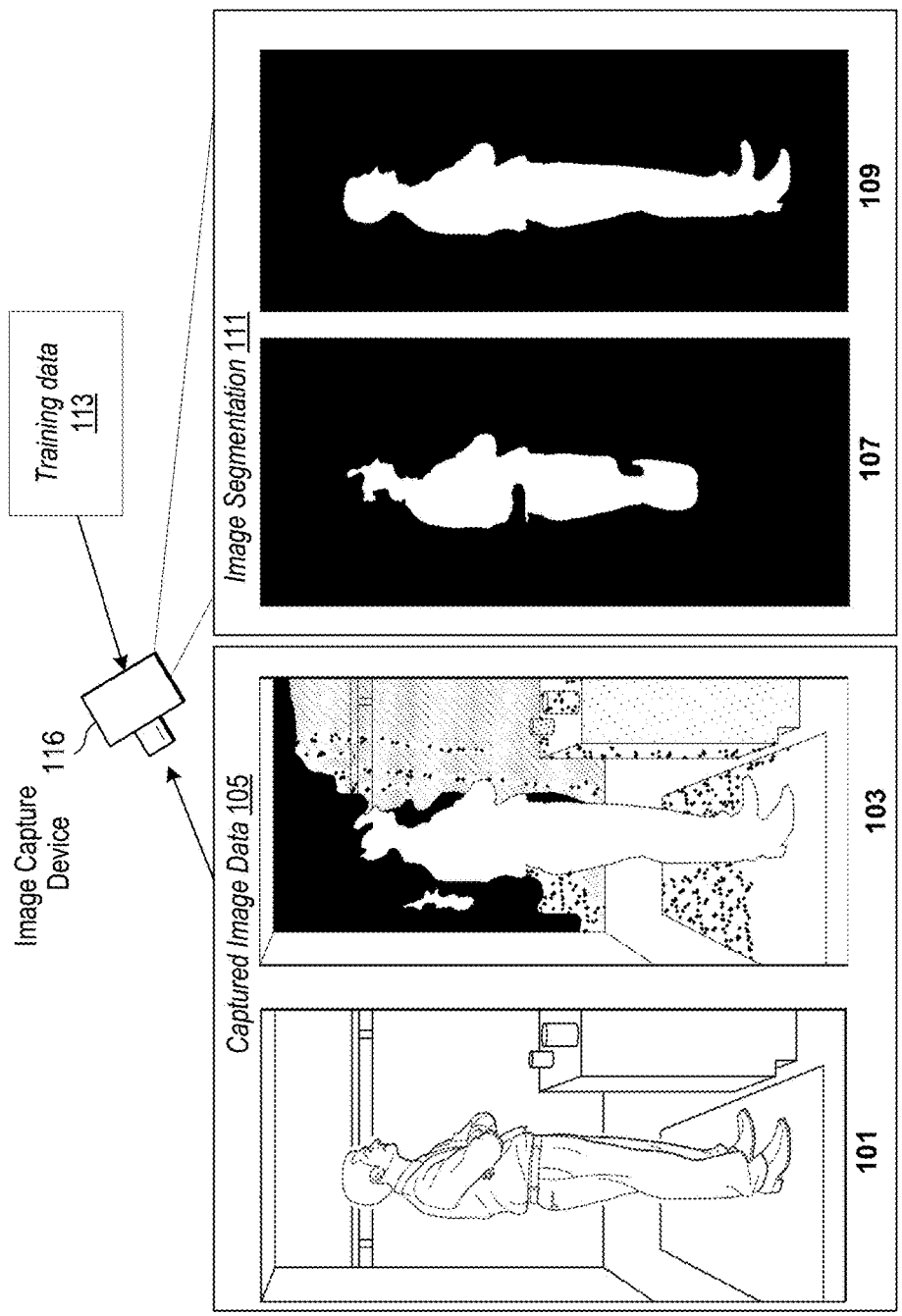
FIG. 1A depicts an example image segmentation of a human subject from a color image and a depth image in accordance with various aspects of the present disclosure.

FIG. 1A depicts an example image segmentation of image data representing a human subject from color image data and depth image data in accordance with various aspects of the present disclosure. As is described in further detail below, an image capture device 116 may comprise a digital camera module effective to capture color images and a depth sensor effective to generate depth images. In the example depicted in FIG. 1A, image capture device 116 may capture RGB image 101 showing a human standing in a room. Additionally, image capture device 116 may capture depth image 103 using, for example, an infrared depth sensor, as described in further detail below. RGB image 101 and depth image 103 may be captured by image capture device 116 and collectively represented as captured image data 105. Captured image data 105 may comprise pixel data representing the standing human. RGB image 101 and depth image 103 may be mapped to one another such that pixel data comprises RGB color values as well as a depth value for each pixel. In other words, pixels of RGB image 101 may be associated with corresponding pixels in depth image 103.

Image capture device 116 may comprise one or more processors and be programmed to perform various image processing tasks on the captured image data 105, including "blob detection" processes for segmenting various regions or clusters in the pixels in the captured image data 105 that differ in properties from surrounding regions. These regions or clusters of pixels are sometimes referred to as "blobs." In the illustrated embodiment, image capture device 116 is effective to perform image segmentation 111. Image segmentation 111 may comprise identifying a main blob 107 using depth data in depth image 103. Main blob 107 may represent a coarse segmentation generated from depth data in depth image 103 and/or RGB image 101. As described in further detail below, image capture device 116 may use the various computer vision techniques described herein to further refine main blob 107 using data from RGB image 101, depth image 103, and/or training data 113 to generate a final segmentation 109 of the human subject from the background data present in RGB image 402 and depth image 404. In the example depicted in FIG. 1A, final segmentation 109 is a binary mask, with pixels encoded with foreground indicator data (sometimes referred to as "foreground pixels") depicted in white and pixels encoded with background indicator data (sometimes referred to herein as "background pixels") depicted in black. In various examples, final segmentation 109 may be used to distinguish between foreground pixels corresponding to a human or other object of interest and background pixels in order to perform various image processing techniques. For example, final segmentation 109 may be used to generate a new image that includes only foreground pixels. In another example, final segmentation 109 may be used to blur only background pixels of the RGB image 101 to emphasize a human subject. The previously mentioned examples of uses of final segmentation 109 are non-exhaustive and are provided merely to illustrate potential uses of a final segmentation 109 generated in accordance with the various techniques described herein.

Figure 1B:
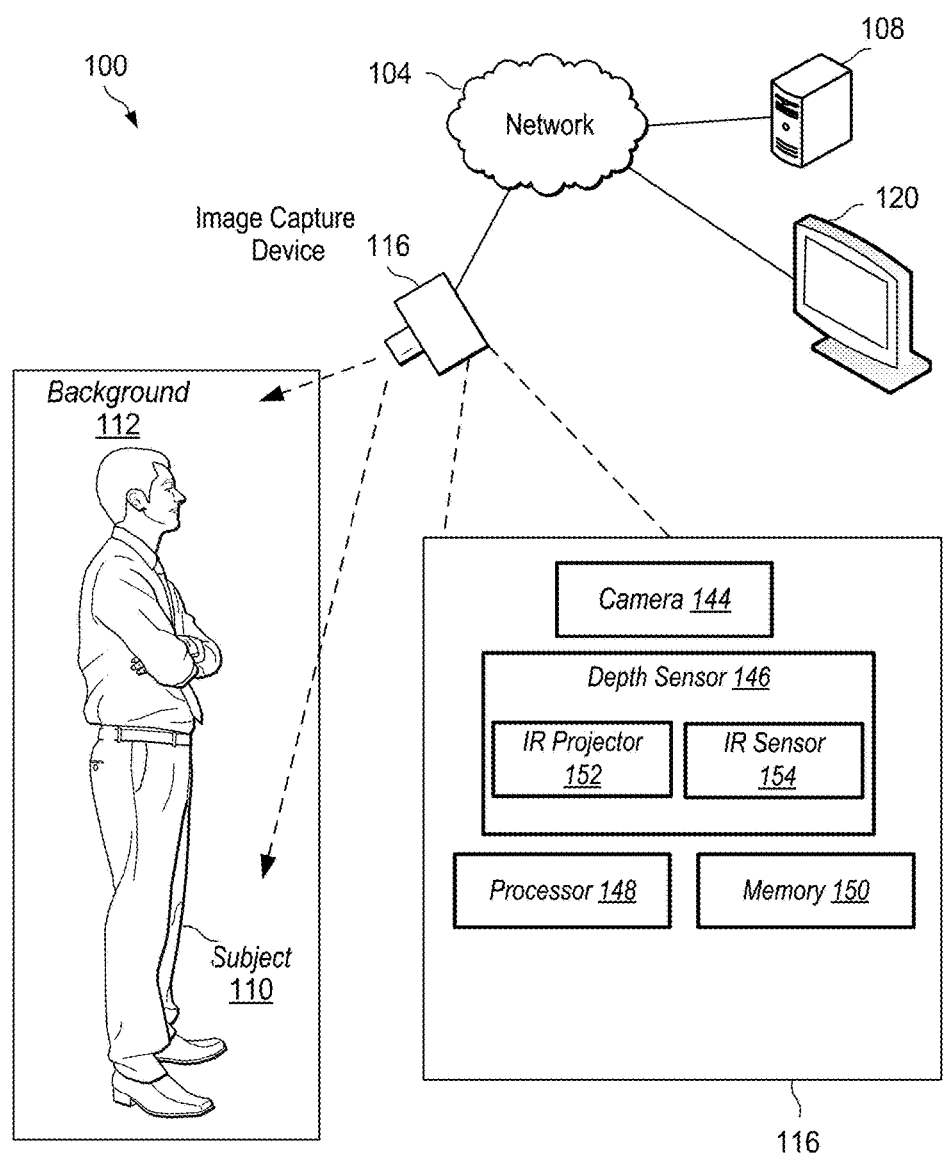
FIG. 1B is a diagram showing an example environment of an image capture system, arranged in accordance with various aspects of the present disclosure.

FIG. 1B is a diagram showing an example environment 100 of an image capture device 116, arranged in accordance with various aspects of the present disclosure. In various examples, the environment 100 may comprise image capture device 116. In various examples, image capture device 116 may be effective to capture an image of a subject 110. In some examples, image data representing an image of the subject 110 may also include image data representing a background 112 which may include image data representing one or more areas around and/or behind the subject captured by image capture device 116. Subject 110 may comprise any visible subject matter capable of being photographed by image capture device 116. In some common examples, subject 110 may comprise one or more people, animals, and/or objects. Background 112 may be, for example, a room, space, or other area in which the subject 110 is located. For example, subject 110 may comprise a human holding an article of clothing. In the example, background 112 may be the room in which the human subject 110 as well as anything captured in the image data other than the subject 110. For example, a bed or desk behind the subject 110 and visible in an image captured of the subject 110 may be considered part of background 112.

Image capture device 116 may include, for example, a digital camera module 144. The digital camera module 144 may comprise any suitable type of image sensor device or devices, such as a charge coupled device (CCD) and/or a complementary metal-oxide semiconductor (CMOS) sensor effective to capture image data from environment 100. In various examples, digital camera module 144 of image capture device 116 may comprise a 5 megapixel color (RGB) camera. Image capture device 116 may include one or more lenses and may be positioned so as to capture images of a portion of environment 100 disposed along an optical axis of image capture device 116. In various examples, lenses of image capture device 116 may be wide-angle lenses effective to capture an angle of view greater than about 55°. Image capture device 116 may include, or may be configured to be in communication with, a processing element (e.g., processor 148) and/or a memory (e.g., memory 150). Although in FIG. 1B image capture device 116 is shown as being angled downward toward a subject 110, image capture device 116 may be positioned at any angle within environment 100.

Image capture device 116 may further comprise a depth sensor 146. Depth sensor 146 may comprise, for example, an infrared projector 152 or any other infrared light source and an infrared sensor 154. Depth sensor 146 may be configured in communication with processor 148 and memory 150 of image capture device 116. Processor 148 may execute instructions stored in memory 150 to control infrared projector 152 to emit one or more patterns of structured infrared light. Infrared sensor 154 may detect the structured light reflected from surfaces of environment 100 (e.g., from surfaces of background 112). Processor 148 may construct a depth map of the infrared light detected by infrared sensor 154 based on deformations in the patterns of structured IR light reflected from irregular surfaces of environment 100. Depth data may be determined for each pixel in the depth map image data. In various examples, depth data may relate to a distance between the portion of environment 100 represented by a particular pixel and the IR sensor 154. More generally, depth data for a particular pixel may relate to a distance between the portion of environment 100 represented in the image data by the particular pixel and the image capture device 116.

In various examples, a depth map generated by depth sensor 146 may model the surface shape, reflectance, color, and/or microgeometry of the environment 100 (including subject 110 and background 112). Although in the examples above a structured light depth sensor is described, in other examples, a time-of-flight depth sensor may be used to generate the depth map used for segmentation of image data, in accordance with various embodiments of the present disclosure.

As described in further detail below, depth data may be used to automatically segment image data representing various items in environment 100 from image data representing other items in environment 100. For example, depth data may be used to segment image data representing a human from image data representing portions of a room in which the human is standing. In some other examples, depth data may be used to segment image data representing an object held in front of a human from the image data representing the human. In various cases, the depth data may allow for a coarse segmentation of image data from other, background image data. As described in further detail below, color image data captured by digital camera module 144 may be used to refine and improve the coarse segmentation of image data performed using the depth data from depth sensor 146.

Each pixel of image data captured by image capture device 116 may comprise color information generated by digital camera module 144 and depth information generated by depth sensor 146. In some examples, digital camera module 144 and depth sensor 146 may be physically located in a known, spaced relationship within a casing and/or frame of image capture device 116. Due to the known placement of digital camera module 144 vis-à-vis depth sensor 146, color image data (e.g., RGB data) captured by digital camera module 144 may be aligned with (e.g., "mapped to") depth data captured by depth sensor 146. In turn, both color information and depth information may be known for pixels of image data captured by image capture device 116. The pixels of image data may, in turn, correspond to particular positions within environment 100.

In various examples, image capture device 116 may be configured in communication with one or more computing devices 108 via a network 104. Network 104 may be, for example, the internet, an intranet, a wide area network, a local area network, or the like. In some examples, image capture device 116 may send image data to one or more other computing devices and/or display devices (e.g., display 120) over network 104. For example, image capture device 116 may send image data representing subject 110 and/or background 112 to a remote computing device 108 for image processing, storage, and/or display.

A user of image capture device 116 may use a companion software application executing on the user's computing device (e.g., a smartphone) to control image capture device 116 to capture images, video, and/or audio (e.g., in instances in which image capture device 116 includes a microphone) from environment 100. For example, subject 110 may be a human user of image capture device 116. Subject 110 may control image capture device 116 to capture an image of subject 110 and the portion of the environment 100 that is within the field of view of the lens of image capture device 116 (e.g., background 112). In some examples, subject 110 may control image capture device 116 to process captured image data and/or send image data to another device or display.

As is described in further detail below, the user of image capture device 116 may control the image capture device 116 in a variety of ways. For example, the user (e.g., subject 110) may control image capture device 116 using voice commands, a companion software application installed on and executed by a mobile device, a desktop computing device, or other terminal, or by a dedicated hardware controller configured to be in communication with image capture device 116. In various examples, the controller device (not shown in FIG. 1B) may communicate with image capture device 116 using network 104 which may be, for example, a Wi-Fi network. In some other examples, the controller device may communicate with image capture device 116 using an infrared signal or other short-range wireless signal (e.g., a Bluetooth signal), wired communication, and/or by a user interface of image capture device 116. In examples where image capture device 116 is effective to communicate wirelessly, image capture device 116 may include a wireless transmitter and/or receivers (not shown in FIG. 1B).

Figure 2:
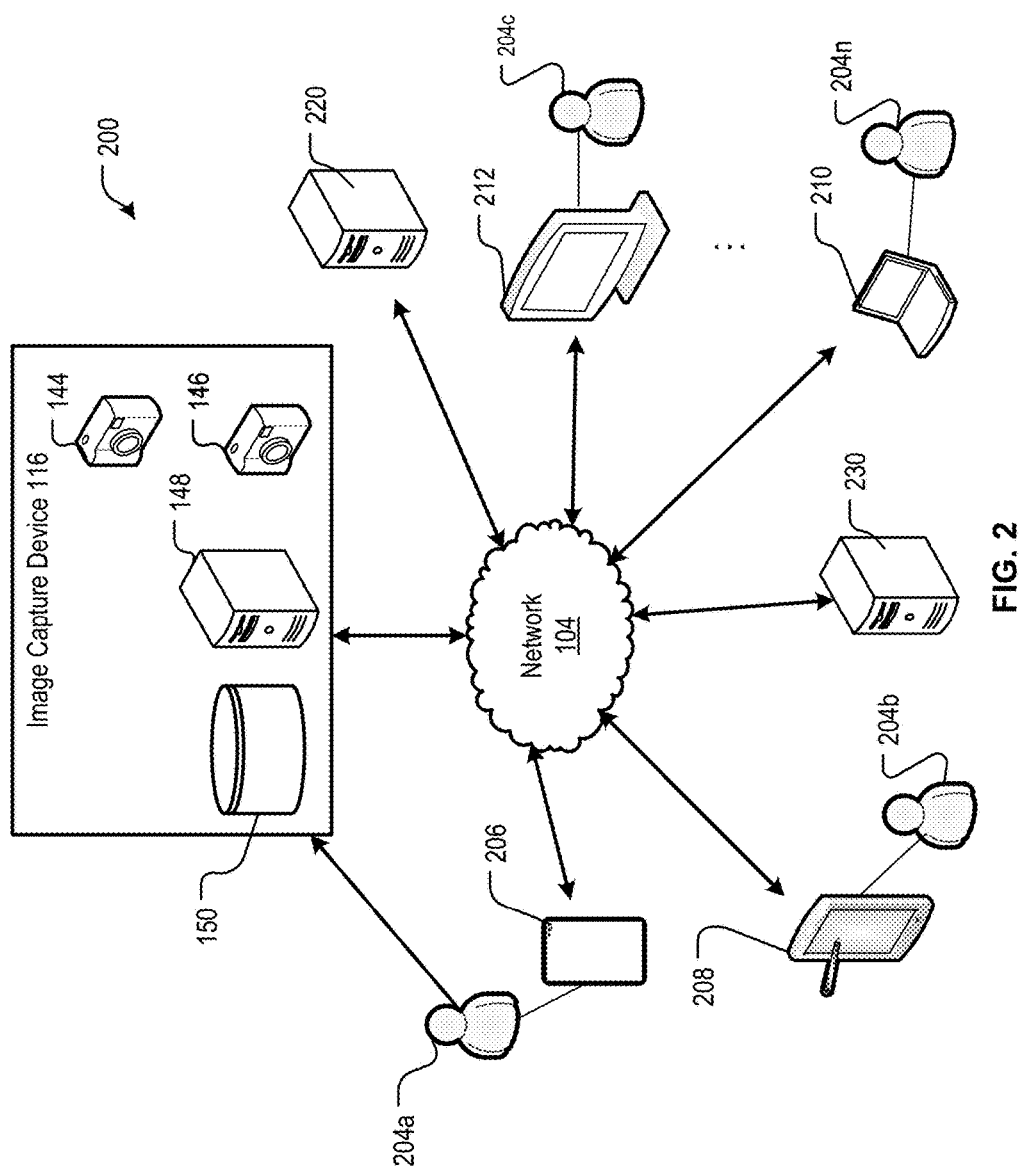
FIG. 2 is a diagram showing an example environment with which the image capture system depicted in FIG. 1B may be used, in accordance with various aspects of the present disclosure.

FIG. 2 is a diagram showing one example of an environment 200 with which the image capture system depicted in FIG. 1B may be used, in accordance with various aspects of the present disclosure. The environment 200 comprises image capture device 116 and users 204a, 204b, 204c, 204n. Each user 204a, 204b, 204c, and 204n may use one or more user devices such as, for example, mobile device 206, tablet computer 208, laptop computer 210, and/or display device 212. Although four users 204a, 204b, 204c, 204n are shown, any suitable number of users may be part of the environment 200. Also, although each user 204a, 204b, 204c, 204n shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

Image capture device 116 may perform the various utilities described herein including, for example, automatic object segmentation in image data. As shown and described, image capture device 116 may comprise one or more digital camera modules 144, one or more depth sensors 146, one or more processors 148, and/or one or more memories 150. Although not depicted in FIG. 2, image capture device 116 may also comprise one or more infrared sensors and/or one or more image filters used for image processing. In some examples, the memory 150 may store images captured by the one or more digital camera modules 144, or received from the various user devices, as well as instructions for image data segmentation, as described herein. In some examples, the various components 144, 146, 148, and/or 150 of the image capture device 116 may be at a common geographic location and/or may be distributed across multiple geographic locations. For example, one or more processors 148 effective to perform image processing of image data captured by image capture device 116 (e.g., object segmentation of image data) may be implemented in whole or in part as a cloud or Software as a Service (SaaS) system. In some examples, the image capture device 116 may perform object segmentation of image data, etc. on images received from multiple different users 204a, 204b, 204c, 204n (e.g., via their associated cameras, computing devices, or other devices). In various other examples, image capture device 116 may perform object segmentation of image data and various other image processing techniques described herein using image data captured locally by the one or more digital camera modules 144. Various user devices (such as mobile device 206 associated with user 204a, tablet computer 208 associated with user 204b, display device 212 associated with user 204c, and laptop computer 210 associated with user 204n) may include a companion application effective to send instructions to image capture device 116. For example, user 204a may execute a companion application on mobile device 206 and may send commands to image capture device 116. In various examples, user 204a may use the companion application to capture image data with image capture device 116 and to segment various objects represented in the captured image data (e.g., objects of interest) from other objects represented in the captured image data (e.g., background objects).

The various components of the environment 200 may be in communication with one another via a network 104. As described previously, the network 104 may be and/or comprise any suitable wired or wireless network configured according to any suitable architecture or protocol. In some examples, the network 104 may comprise the Internet.

User devices, such as mobile device 206, tablet computer 208, display device 212, and laptop computer 210 may be utilized to control image capture device 116 to capture still and/or video images. In various examples, user devices may execute a companion application to control operation of image capture device 116 and/or display device 120 (e.g., a projector device). Similarly, in some examples, user devices such as mobile device 206, tablet computer 208, display device 212, and laptop computer 210 may be utilized to send image data captured by and/or processed by image capture device 116 to integrated or external display devices for display. For example, image capture device 116 may comprise a short throw projector device (not shown in FIG. 2). A user device such as tablet computer 208 may be effective to send an instruction to image capture device 116 (e.g., through a companion application) to send image data to the short throw projector device for display.

In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 116, for example, via the network 104. Although user devices are described as mobile device 206, tablet computer 208, display device 212, and/or laptop computer 210, the user devices may be any suitable type of computing device comprising at least one processor and non-transitory computer-readable memory. In some examples, the user devices may be configured to receive image frames captured by the image capture device 116. In some examples, the user devices, such as mobile device 206, tablet computer 208, display device 212, and/or laptop computer 210, may be configured to communicate on a cellular or other telephone network.

In various examples, users, such as users 204a, 204b, 204c, 204n may control image capture device 116 using audible commands. For example, a user 204a may speak a "wake word" that may be a spoken, audible command. A wake word may be, for example, a word or phrase for which a wake word engine of image capture device 116 continually listens. A microphone of image capture device 116 may detect the spoken wake word and, in response, subsequent audio captured by the microphone may be processed to detect further audible commands and/or the subsequent audio received by the microphone of image capture device 116 may be transmitted to a voice recognition server 220. In the example, user 204a may "wake" the image capture device 116 to further voice commands using the wake word, and may thereafter speak an audible command for image capture device 116 to take a video or take a picture. Similarly, a user may speak an audible command for image capture device 116 to segment image data representing a particular object in the image or video from other image data. For example, a user may speak an audible command for the image capture device 116 to segment image data representing an article of clothing from image data representing the remainder of the captured image or vide. Audio may be transmitted/streamed from image capture device 116 over network 104 to voice recognition server 220 in any audio file format, such as mp3, mp4, or the like. Voice recognition server 220 may receive the transmitted or streamed audio. Upon determining that the audio content has reached an endpoint, voice recognition server 220 may analyze the received audio stream and may translate the audio stream into natural language. Voice recognition server 220 may determine whether or not the natural language corresponds to a command. If so, the voice recognition server 220 may send the command over network 104 to image capture device 116. For example, a user 204a may speak the command, "Take a picture" to image capture device 116. Image capture device 116 may transmit the voice command to voice recognition server 220. Voice recognition server 220 may analyze the audio stream and may translate the audio stream into natural language. Voice recognition server 220 may determine that the natural language "Take a picture" corresponds to a command effective to instruct image capture device 116 to capture an image using digital camera module 144 and/or depth sensor 146. Voice recognition server 220 may send the command over network 104 to image capture device 116. The command may be effective to cause image capture device 116 to capture an image.

In other examples, a user 204a may speak the command, "Take picture" to image capture device 116. Image capture device 116 may transmit the voice command to voice recognition server 220. Voice recognition server 220 may analyze the audio stream and may translate the audio stream into natural language. Voice recognition server 220 may determine that the natural language "Take picture" corresponds to a command effective to instruct image capture device 116 to segment image data representing a human subject or other object of interest from other image data in a selected image. In various examples, the selected image may be stored in memory 150 or may be stored in a different memory accessible by image capture device 116 over network 104. Voice recognition server 220 may send the command over network 104 to image capture device 116. The command may be effective to cause image capture device 116 to access and perform the image processing operations related to segmentation of the clothing from the background image data, as described in further detail below.

In some embodiments, the microphone for capturing voice commands may be a far field microphone. In some embodiments, the microphone may be provided on a different device separate from the image capture device 116. The processing of the voice command and/or transmission of the audio to the voice recognition server 220 may similarly be performed by a device other than the image capture device 116.

In various examples in which the various image processing techniques (e.g., object segmentation in image data) are implemented at least in part in a cloud service or SaaS environment, such techniques may be performed at an image processing device 230. Although depicted as different computing devices in FIG. 2, in some examples, image processing device 230 and voice recognition server 220 may be implemented in the same housing. Similarly, in various examples, image processing device 230 may be implemented in the same housing as image capture device 116. In yet other examples, image processing device 230 may receive image data captured by image capture device 116 via network 104. After performing image processing in accordance with the various techniques described herein, image processing device 230 may send transformed image data over network 104 to image capture device 116 and/or to one or more user devices and/or other computing devices, such as, for example, a social media server. In some examples, processed image data may be sent to a computer vision system (not shown). The computer vision system may be programmed to recognize various features of an object or subject depicted in the processed images. For example, the computer vision system may be programmed to recognize a face of a subject, a type, category, brand, or designer, of clothing, etc. Clothes may be identified by matching a particular item of clothing segmented from other image data or otherwise tagged within image data to a particular item of clothing known to have been purchased by the user of image capture device 116 or stored in a database, such as an online-shopping catalog database. For example, the computer vision system may be in communication with one or more other computing systems that include profile information related to the subject. The computer vision system may identify particular articles of clothing worn by a subject by querying other computer systems, such as a server of an online-shopping website from which the user has purchased those articles of clothing. Similarly, the computer vision system may identify a subject by querying a computer system hosting a social media platform, which can provide to the computer vision system information about the subject (e.g., information about clothing purchased by the subject, worn by the subject in photos available to the social media platform, owned by the subject from a virtual wardrobe created by the subject, or other types of information available to social media platforms or made available to the computer vision system) to assist with the identification of that clothing by the computer vision system. In various examples, the computer vision system may be effective to insert metadata into the perspective-transformed image. In some examples, such metadata may be optionally displayed when image data is projected by image capture device 116. The metadata may comprise a metadata "tag," or a hyperlink that, which selected by the user, will direct the user to a retail website where the particular article of clothing can be purchased. Additionally, image processing techniques, such as the object segmentation techniques for image data described herein, may be used to isolate and label clothing image data to build databases of clothing image data.

Figure 3:
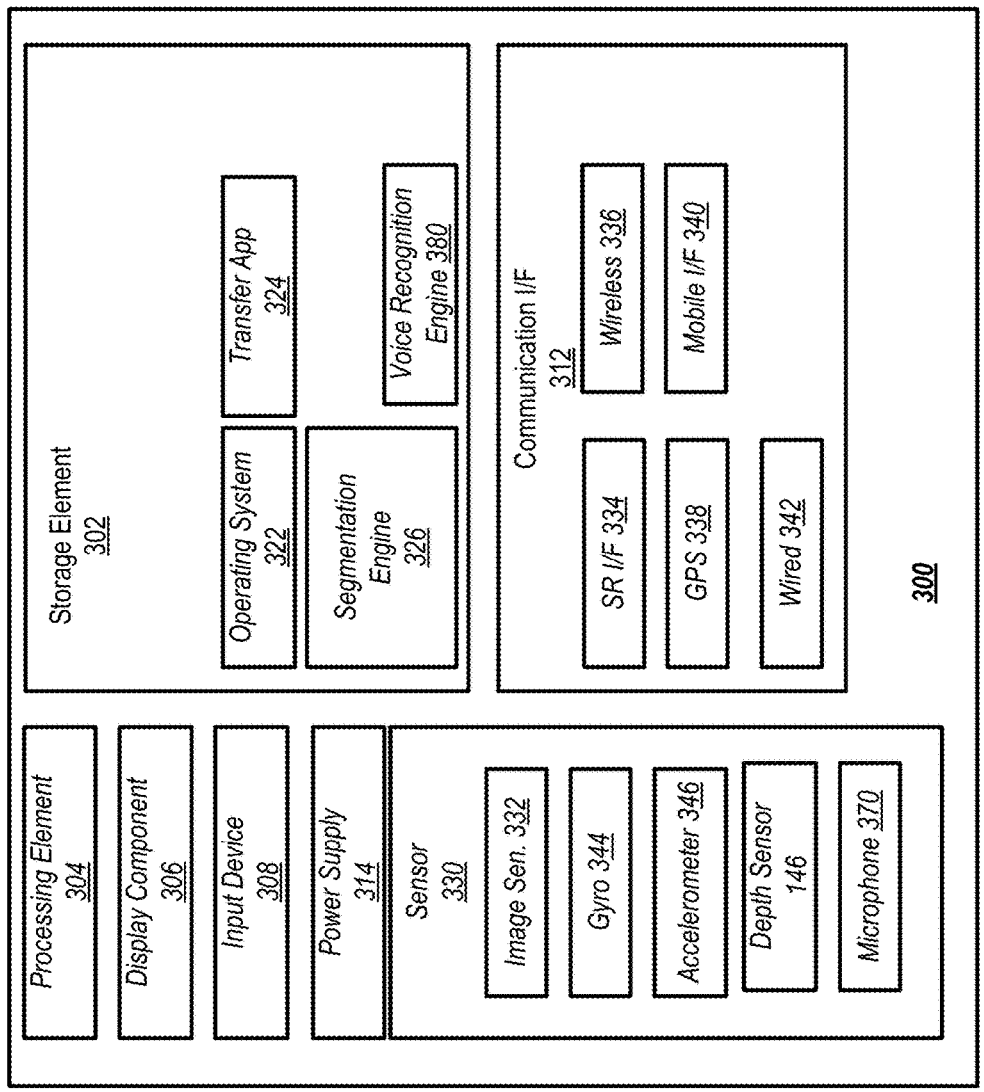
FIG. 3 is a block diagram showing an example architecture of a computing device in which the image capture system described in the present disclosure, or a portion thereof, may be implemented, in accordance with various embodiments described herein.

FIG. 3 is a block diagram showing an example architecture 300 of a user device, such as the image capture devices, cameras, display devices, mobile devices, and/or other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to perform object segmentation techniques for image data, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, image capture device, and/or display device). In some examples, the transfer application 324 may also be configured to upload the received images to another device that may perform processing as described herein (e.g., a mobile device, another computing device, and/or image processing device 230). Segmentation engine 326 may be effective to segment image data representing an object of interest, such as a human subject, from background image data, using the various techniques described in further detail below.

When implemented in some user devices, the architecture 300 may also comprise a display component 306 (e.g., display 120 depicted in FIG. 1B). The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis, as described above in reference to FIG. 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image capture device 116 (shown in FIG. 1B), mobile interface 340 may allow image capture device 116 to communicate with one or more other computing devices such as the various computing devices shown in FIG. 2. For example, image capture device 116 may receive a command from a user device, an application of a user device, or a voice recognition server to capture an image. Image capture device 116 may receive a command from the user device to send the captured image frame to the mobile device or to a social media site.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 116 and/or display device 120 (shown in FIG. 1B).

The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Depth sensor 146 may be effective to determine a distance between image capture device 116 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 304 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of environment 100 (shown in FIG. 1B) In some examples, processing element 304 may be effective to determine the location of various objects in the physical environment within the field of view of image capture device 116 based on the depth map created by the depth sensor 146. As noted above, in some examples, non-infrared depth sensors, such as passive stereo camera pairs, or non-identical camera pairs, may be used in image capture device 116 in place of, or in addition to, infrared light sources of depth sensor 146. Processing element 304 may build a depth map based on detection by non-infrared depth sensors of a pattern of light displayed on a surface by a light source. Processing element 304 may be effective to determine the location of various objects in the physical environment within the field of view of image capture device 116 based on the depth map created by one or more non-infrared depth sensors.

The following description is in reference to FIG. 1A. FIG. 1A depicts four images: an RGB image 101, a depth image 103, a main blob image 107, and a final segmentation image 109. The following descriptions provide example techniques for producing final segmentation image 109 using RGB image 101, depth image 103, and/or training data 113. In some examples, a main blob image 107 may represent a coarse segmentation generated from depth image 103. As described in further detail below, main blob image 107 may be further refined using data from RGB image 101, depth image 103, and training data 113 to generate final segmentation 109. In some examples, digital camera module 144 of image capture device 116, depicted in FIG. 1B, may be effective to generate image data representing RGB image 101. Similarly, depth sensor 146 of image capture device 116 may be effective to generate depth data representing depth image 103. In some other examples, an RGB camera used to generate RGB image 101 may be a separate device, and/or may be located in a different housing, relative to a depth sensor 146 used to generate depth image 103.

Image segmentation poses a challenging problem in computer vision (CV). For example, it is challenging to obtain pixel level accurate segmentation of objects and humans (figure ground separation) relative to background image data. Even in constrained environments, where the background is partially known (e.g., bin picking) or can be obtained using additional images, obtaining an accurate segmentation is highly challenging.

For indoor applications, the image segmentation problem may be further confounded by unconstrained indoor environments, challenging low light conditions, significant changes in illumination (e.g., day vs. night), low contrast between a subject and the background, non-homogenous colors on a subject's clothing, etc. Additionally, some structured light depth sensors operating in the IR domain may have difficulty generating depth data for items with low IR reflectivity (e.g., non-reflective clothing), hair, dark backgrounds, sunlight, incandescent lighting and/or far-away backgrounds. When depth data is unable to be generated using an IR sensor, the resulting depth image (e.g., depth image 103 of FIG. 1A) may comprise "depth holes", which are pixels that do not include depth data. These depth holes typically occur where the depth sensor has not provided usable depth information for various reasons. Structured light depth sensors may typically generate more holes for a given depth image relative to an equivalent time-of-flight IR depth sensor. In various examples, depth sensor 146 may be unable to generate depth information for all pixels in an image under various challenging conditions. As such, the depth images representing an environment with challenging conditions may include a high incidence of depth holes in the captured depth image. Examples of challenging conditions may include an image captured in bright sunlight, an image captured in incandescent lighting, and an image captured where the subject is wearing dark, unreflective clothing, etc.

Although recent advances in deep learning and convolutional neural network (CNN) processing have shown significant improvements in semantic image segmentation, such techniques are often quite demanding in terms of run-time and/or memory resources. It can pose a challenge to run image segmentation using a relatively low-powered, low memory, embedded system while maintaining a low latency output. For example, in some examples, image capture device 116 may include a microprocessor of limited speed and/or graphical processing capability. However, the techniques described herein may produce high quality image segmentation output at low latency even with limited graphical processing power. Additionally, while in some examples cloud computing may be used to enhance or speed up the image segmentation techniques described herein, in at least some other examples, image segmentation may be performed entirely on-device. For example, processor 148 of image capture device 116 (depicted in FIG. 1B) may execute the image segmentation techniques described below.

In an example, a graphics processing unit (GPU) of processor 148 of image capture device 116 may comprise 84 compute units running at about 500 MHz with boost clock. By contrast, the TITAN X GPU by NVIDIA Corporation of Santa Clara, Calif., has approximately 3000 CUDA cores (compute units) running at 1531 MHz with boost clock. In the illustrated embodiment, the GPU of image capture device 116 has about 100 times less computation power than NVIDIA TITAN X. In terms of CPU processing, the image capture device 116 in this example may have a CPU that is 4 times slower than a standard desktop computing device with 16 GB RAM and a Core i7 microprocessor by Intel Corporation of Santa Clara, Calif. It should be appreciated that image capture device 116 may include any type of processor and/or memory. The examples described above are mentioned merely to illustrate that the low latency image segmentation techniques described herein may be performed without high end GPUs, fast processing units, and large amounts of memory.

In some examples, CNN-based approaches may require large amounts of memory to store the CNN model and intermediate layer results in a forward pass. Densely Connected Convolutional Networks (DenseNet) architecture may be used to reduce network size, but some embodiments of the present invention may perform these processing methods using less than 150 MB available for CV processing.

Image Segmentation Techniques

Classical CV segmentation approaches uses a MRF/CRF framework (Markov random field/conditional random field), where the energy (cost) of segmentation is defined as:

$$E(x) = \Sigma \Phi_i(x_i, y_i) + \Sigma \Phi_{ij}(x_i, x_j, y_i, y_j) \qquad (1)$$

where x denotes pixels and y denotes the labeling of each pixel. For binary segmentation, labels for pixels are "foreground" or "background." Pixels may be encoded, classified, or otherwise labeled as either "foreground" or "background" by encoding the pixels with foreground indicator data or background indicator data. Foreground indicator data and background indicator data may comprise one or more bits that indicate the label of the pixel. The energy terms are dependent on the labels. $\Phi_i(x_i, y_i)$ denotes the cost of a pixel $x_i$ taking the label $y_i$. Popular approaches include learning filters (RGB domain) that can give a good local estimate of probability of foreground vs background. Other approaches may utilize deep learning and CNN to learn these filters and obtain the local estimates using learned filters.

The clique potential $\Phi_{ij}(x_i, x_j, y_i, y_j)$ denotes the cost of neighboring pixels taking different labels. In order to minimize the energy, an inference algorithm is used. Graph-cuts is an inference algorithm that can provide a global optimum under sub-modular cost functions. However, inference for Graph-cuts is computationally expensive and has difficulty incorporating higher-order clique potentials and long range interactions between pixels.

Gaussian conditional random fields (GCRFs) may be used to model the segmentation problem and can lead to fast inference. GCRFs can also be motivated from a quadratic cost function point of view. In some examples, the segmentation problem may be formulated as a quadratic optimization. Local probabilities may be computed for each pixel using a graphical model. The local probabilities may be refined using a non-local graph structure in the color (RGB) image. Instead of modeling the segmentation as a binary variable (0 or 1), the segmentation model may instead be modeled as a continuous variable between 0 and 1 using multi-matting techniques. The energy of the system may then be modeled as a quadratic least square function, which leads to a sparse linear system. Accordingly, the inference can be done in a fast manner.

The segmentation techniques described below may be used to reduce latency while executing with a low computational budget. Designing a large energy minimization problem where inference is run for each pixel is prohibitive. Instead, a cascade approach is used, which allows for an initial quick and low-cost inference for the majority of pixels followed by successively refined "foreground" or "background" label estimates for the remaining pixels. For example, if an efficient human detector algorithm is used, pixels which are spatially away from the detected human and have a large depth difference from the detected human pixels may be labeled as "background" without running an expensive inference. Pixels near the boundary of human/background boundary may require more computationally expensive inference.

Figure 5:
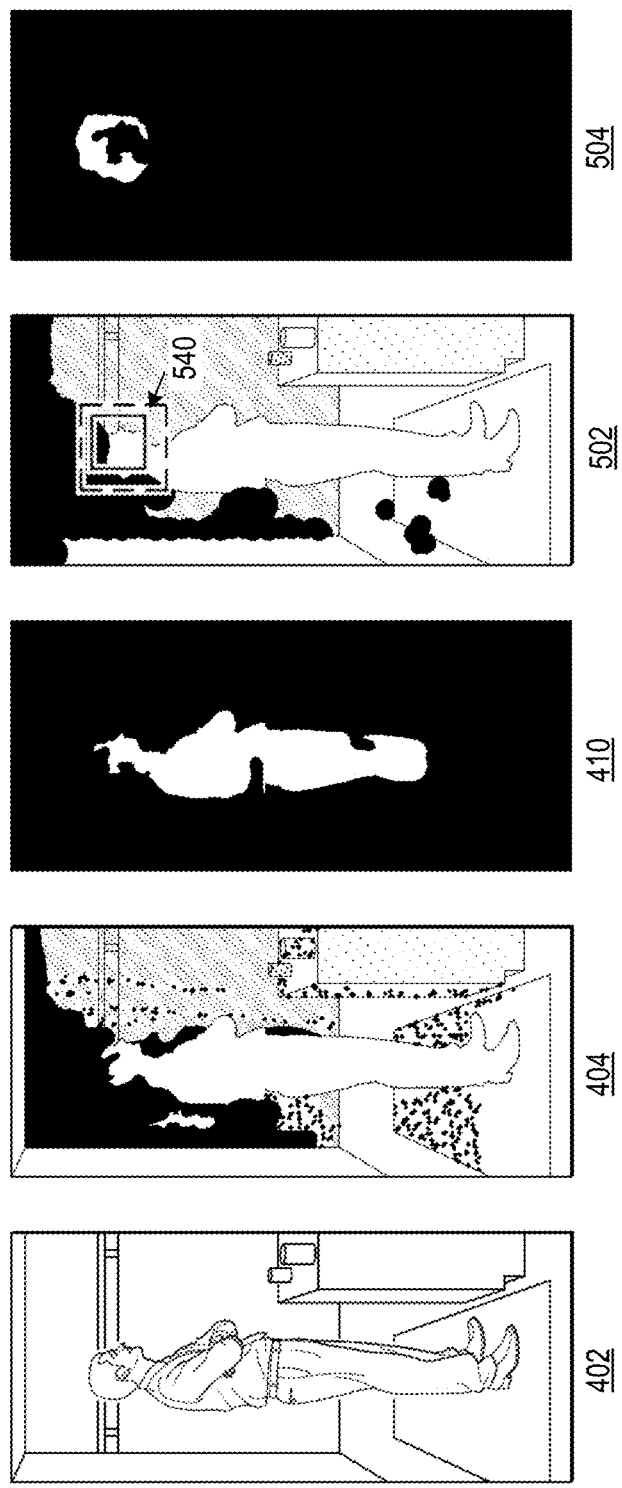
FIG. 5 depicts an RGB image, a first depth image, a second depth image depicting main blob selection, a third depth image depicting face/upper body detection, and a fourth depth image depicting use of a hair prior, in accordance with the various image segmentation techniques described herein.

Depth data generated by depth sensor 146 may be used (along with color data generated by digital camera module 144) to determine the local probability estimates $\Phi_i(x_i, y_i)$ for each pixel. In addition, other local and global cues may be used to define the per-pixel probabilities, to account for short-comings of the depth sensor. For example, human hair can be very challenging to detect using depth sensor 146 often resulting in depth holes in the depth image data at positions corresponding to hair. In the processing techniques described below, face detection algorithms that define a human head region of interest (ROI) may be used. For example, image 502 in FIG. 5 depicts an image in which a human head region of interest 540 has been defined. In image 502, the solid box around the face of the human subject may represent the identification of the human face using a facial recognition algorithm. The region of interest 540 may comprise the dashed box in image 502. The region of interest 540 may be a band of image data around the region identified as the human face or head using facial recognition and/or upper torso recognition algorithms. Based on the defined human head ROI 540, a probability of a pixel to be hair may be determined based on the distance of the pixel from the face. Similarly, depth sensor 146 may fail to generate depth data for pixels representing distant backgrounds and/or sun-lit windows. A background prior process may be used to detect long straight lines in the background 112 of the image data (e.g., in the background of the image) and label such pixels as background. Long straight lines may include a number of pixels disposed in a straight line in the color or depth image data, wherein the number of aligned pixels exceeds a threshold number of pixels (e.g., a length threshold value). In examples where image capture device 116 is kept in one position over a period of time, the background 112 may also be modeled using multiple images captured over time to generate a background model of an environment. The background model may comprise mean and standard deviations of depth values for each pixel, computed over multiple captures for background regions (e.g., pixels of encoded with background indicator over multiple captures/image segmentations). Additionally, the background model may comprise statistics relating to depth hole pixels and/or groups of depth hole pixels (e.g., average color values over multiple captures). For a given image capture, the background model may be used to assign greater background probability (e.g., lower a values as described in further detail below) to pixels with depths within a threshold distance of pixels known to be background pixels from the background model. The background model may be stored in a memory. Subsequent image data captured by image capture device 116 may be compared to the background model and portions of the captured image data may be classified as background based on a correspondence between the portions of the captured image data and image data in the background model. Additionally, movement of the image capture device 116 from one location associated with a background model currently stored in memory to a second, new location may be detected by comparing image capture data to the background model and detecting large scale changes. For example, if less than a threshold number of pixels and/or macroblocks of newly captured image data comprise depth values that do not correspond to the background model, a determination may be made that image capture device 116 has been moved to a new location and that the background model currently stored in memory is not valid for the new location. If such large scale changes indicating movement of the image capture device 116 are detected, the currently stored background model may be deleted from memory and a new background model may be generated from image data captured from the new vantage of the image capture device 116's new location/position. These local and global cues may be used to overcome the limitations of a structured light depth sensor by providing labels for pixels for which no depth data has been generated (e.g., depth holes).

A cascade of classifiers as well as additional local cues may be used to assign probabilities $\Phi(x)$ to each pixel using depth data generated by depth sensor 146 and color data generated by digital camera module 144. These classifiers may be learned using labeled images, where each pixel in the color image is labeled as foreground or background. Since the geometric calibration between the digital camera module 144 and depth sensor 146 is known, the depth image (e.g., depth image 103 of FIG. 1) may be mapped to the color image (e.g., RGB image 101 of FIG. 1) coordinate system. For example, a correspondence between a pixel of the depth image 103 and a second pixel of the RGB image 101 may be determined using the calibration information. Therefore, the foreground/background labels of the labeled color image may be applied to the corresponding pixels in the depth image. In some examples, the depth image (e.g., depth image 103 of FIG. 1) may be of a lower resolution relative to the color image (e.g., RGB image 101 of FIG. 1). As such, a particular pixel of the depth image may be associated with multiple pixels in the higher resolution color image. Similarly, in some other examples, the depth image may be higher resolution relative to the color image. In such an example, multiple pixels of the higher resolution depth image may be mapped to a single pixel in the lower resolution color image.

Advantages to using multiple classifiers as compared to designing a single classifier to classify each pixel may include: (a) classifiers may be relatively simple; (b) classifiers can be trained with less data; and (c) a better tradeoff between false positives and false negatives may be realized using multiple classifiers. By contrast, a single classifier may require a very low false positive and false negative rate, and may therefore require a larger amount of training data.

Classifier Training and Cascade Approach

Notations—

Each capture of image data by image capture device 116 generates a color image $I(x)$, a depth image $Z(x)$, and an infrared image $IR(x)$, where x denotes a pixel. Let $\alpha(x)$ denote the continuous segmentation value for each pixel, with a value of 1 for a foreground label and −1 for a background label. Pixels with no depth information (e.g., pixels for which no depth data is provided by the depth sensor 146, sometimes referred to as "depth holes") have $Z(x)=0$.

Depth Image Pre-Processing—

Figure 4:
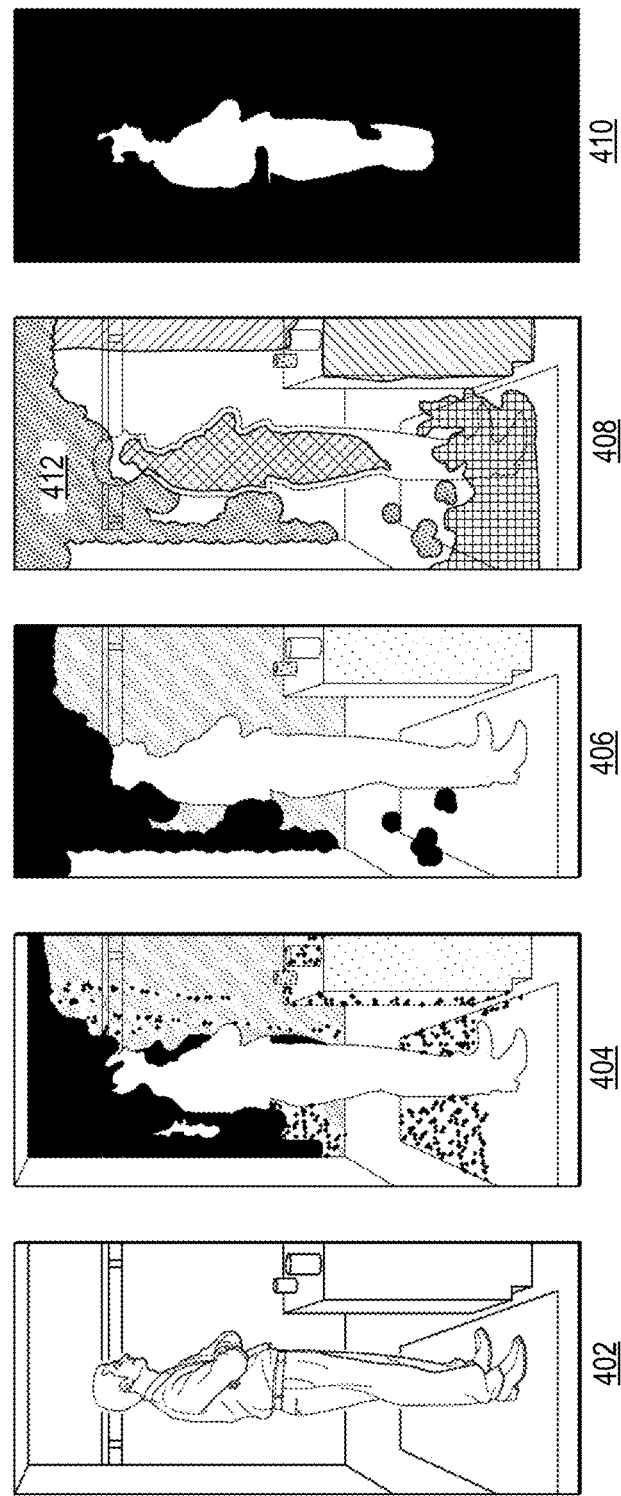
FIG. 4 depicts an RGB image, a first depth image, a second depth image in which small holes are filled using interpolation, a third depth image depicting separation of image data into "blobs", and a fourth depth image depicting main blob selection, in accordance with the various image segmentation techniques described herein.

The depth image $Z(x)$ may be denoised using a median filter. Small holes (e.g., clusters of pixels with no depth information) may be filled via guided interpolation using the IR image. In some examples, small holes may be selected for filling based on the size of the holes. For example, clusters of depth holes that have no dimensions greater than 15 pixels in length may be considered a small hole and may be filled using guided interpolation techniques described herein. The guided interpolation filling technique may be formulated as a weighted Poisson equation on a 4-connected graph. The weight between two neighboring unknown depth pixels is derived using the difference in the corresponding IR values. This leads to a sparse linear system with known depth values on the boundary of the small holes acting as Dirichlet boundary conditions. FIG. 4 depicts an RGB image 402 and a depth image 404. Depth image 406 represents depth image 404 after filling small holes using the guided interpolation techniques described above.

Since a human subject (e.g., subject 110 depicted in FIG. 1B) standing on a floor is connected to the floor in the depth data, the floor plane (ground plane) is first removed to segment the subject from the surroundings. The floor plane may be a lower surface of an environment in which the image capture device 116 and/or the subject 110 is located. The image data representing the floor may be removed using RANSAC on the depth image to identify the ground plane. The pixels identified as the ground plane (e.g., the floor) may be removed (e.g., deleted) from the depth frame. A connected component analysis may be executed on the remaining depth data to over-segment the depth data into clusters of pixels (sometimes referred to herein as "blobs"). This results in N clusters in the depth frame, wherein each cluster is associated with a respective range of depth values. In depth image 408 of FIG. 4, pixels with similar depth values have been clustered using a connected component analysis. The various clusters of depth image 408 are depicted with different cross-hatch patterns in FIG. 4 to illustrate that each cluster of the plurality of clusters is associated with a respective range of depth values. Note that depth holes (e.g., pixels with a depth value of 0 such as pixels in region 412 of image 408) form separate blobs and a "hole blob" can span both foreground and background.

The over-segmentation technique described above reduces the dimensionality of the problem. For example, for a VGA image, instead of classifying each pixel (307K pixels) as foreground or background, we can classify blobs which typically comprise a few thousand pixels. In various examples, foreground indicator data may be associated with the data representing the main cluster (or "blob") to classify the main cluster (or "blob") as foreground. In FIG. 4, image 410 represents a binary mask of main blob selection. Pixels of the main blob are labeled as "foreground" by encoding the pixels with foreground indicator data. Foreground pixels are depicted in white in image 410. Similarly, pixels that are not part of the main blob are labeled as "background" by encoding these pixels with background indicator data. Background pixels are depicted in black in image 410. Following main blob selection, the image segmentation techniques may proceed to classification of blobs comprising valid depth data and classification of depth holes (e.g., blobs comprising non-valid depth data).

Main Cluster/Blob Selection

Main blob selection is used to identify and/or determine a single blob or cluster that corresponds to the human subject or other object of interest. Pixels of the main blob are labeled as foreground. As used herein, labeling one or more pixels as foreground or background may include encoding the image data (e.g., the pixel, blob, cluster, frame, etc.) with foreground or background indicator data. Foreground and/or background indicator data may comprise a number of bits that may indicate whether the particular image data is classified as foreground or as background. Note that the subject may be disconnected into multiple blobs due to the over-segmentation techniques described above. In at least some examples, one or more of the various techniques for main blob selection described below may be used in order to identify the main blob. Although all of the techniques described below may be used in conjunction to identify the main blob, in some examples, a subset of the various techniques described below may be used for main blob identification, depending on the desired implementation.

Any suitable face detection and upper body human detection algorithm may be employed in the RGB image to restrict the region of interest (ROI) to search for the main foreground blob in the depth image. The depth image may be mapped to the color image such that a pixel of the depth image is associated with one or more pixels in the color image (depending on the resolution). A region in the color image data identified as including a human face using a facial recognition algorithm may correspond to an associated region in the depth image. The cluster including the human face region in the depth image may be a candidate blob for the main foreground blob. Blobs with a size (e.g., blob dimensions and/or area) less than a lower size threshold, blobs with a size (e.g., blob dimensions and/or area) greater than an upper size threshold, and obvious background blobs may be removed by being labeled as "background". Obvious background blobs may be identified based on the average depth value of the blob exceeding a high distance threshold. In some examples, the high distance threshold may relate to a typical distance between a lens of image capture device 116 and a subject (e.g., subject 110 depicted in FIG. 1B). Similarly, in at least some examples, blobs with average depth values that are below a low distance threshold (e.g., blobs representing objects that are too close to the depth sensor) may be excluded from a set of candidate main blobs. In some examples, subjects may often be positioned within a certain distance of image capture device 116. For example, subjects may be positioned within about 2 meters of image capture device 116. In some other examples, subjects may be positioned within about 2.5 meters from image capture device 116. These distances are provided as examples only, and any desired distance may be used in accordance with the techniques described herein. In various other examples, image capture device 116 may utilize a long focal length camera, and, accordingly, the subject may be positioned further from the image capture device 116 than would typically be the case when using a shorter focal length camera. Blobs may be identified as "obvious background blobs" when the average depth value of pixels of the blob far exceeds the average distance of the subject in a particular configuration of image capture device 116. In some examples, blobs with average depth values that are more than 2.5 m, 3.0 m, 3.3 m, 2.1 m, 1.8 m, or another desired distance, may be identified as obvious background blobs depending on the particular configuration of image capture device 116. In some other examples, blobs with average depth values that are more than 2×, 1.5×, 3×, 4×, 3.1×, etc., the average distance between the subject and the image capture device 116 may be identified as obvious background blobs, depending on the particular configuration of image capture device 116. After removal of too-small, too-large, and obvious background blobs, the number of remaining candidate blobs for selection as the main blob are considerably reduced. For example, after removal of the non-candidate blobs described above (e.g., too-small, too-large, and obvious background blobs), fewer than 10 candidate blobs may remain for selection of the main blob representing the subject. Intuitively, it is desirable to select the blob as the main blob that includes one or more desired characteristics. For example, desired characteristics of the main blob may include the blob which is largest in size, closest to the image capture device 116, not entirely disposed close to the ground or floor, as the subject is unlikely to be entirely close to the ground or floor, etc. As such, intrinsic features may be developed for selecting the main blob based on these desired characteristics.

Training data may be used to derive shape features (e.g., Hu moments, central moments) for positive and negative user/subject blobs. Derived shape features may be stored in a database in memory 150. During the main blob selection, K nearest neighbors within the feature database are found for each blob. The average distance between each blob and the shape feature is computed in the feature space. A cost function combining the distance of shape features and weighted intrinsic features is generated. The cost function is used to determine the blob that has the minimum cost. Weights in the feature space may be tuned using available training data.

Advantageously, since only one main blob is selected at this stage of processing, a classifier to classify all blobs (requiring high recall and high precision) need not be used. However, the above techniques may still provide highly accurate main blob selection. In some examples, the failure rate for main blob selection in accordance with the above techniques may be less than 1% on a dataset of 8000 images (99% accuracy). Note that due to the cascade approach of image segmentation described in the present disclosure, if the main blob is mis-detected, the error is irrecoverable and the segmentation process will need to be re-executed. Accordingly, a very high accuracy is needed during main blob selection.

Pixels of the selected main blob are labeled as "foreground". In various examples, no later inference may be run for the pixels within the selected main blob, significantly reducing the number of unknowns in the final inference. The depth image data may be mapped to the color image data, as previously described. Accordingly, pixels of the color image that are associated with the pixels of the main blob in the depth image may effectively be labeled as "foreground". Similarly, pixels in the color image that are associated with background pixels in the depth image may effectively be labeled as "background".

Conditional Classification of Valid Depth Blobs

In the following examples, $B_m$ denotes the selected main blob. A classifier may be trained to classify remaining depth blobs as "foreground" or "background". The classification may be conditioned on the selected main blob $B_m$. As used herein "valid depth blobs", refers to blobs that are not depth holes and thus have valid depth values. Processor 148 may be effective to find $P(B/B_m)$ for each valid depth blob B. All pixels x in B may be assigned the same probability.

For each blob B, several intrinsic features may be defined by processor 148 using the depth data of the blob. Additionally, relative features of each blob B may be identified with respect to the main blob to determine a relative similarity (or relative lack of similarity) between the blob being evaluated and the main blob. Intrinsic features may comprise average 3D position, standard deviation in x, y, z directions, distance from ground plane, blob size, average depth of blob in millimeters, average spatial distance of pixels in a particular blob from main blob (in terms of a number of pixels), distance from main blob in millimeters, percentage overlap with a facial region or other region of interest, spatial location of blob center with respect to main blob center, spatial location of blob center with respect to top (or other point) on main blob, etc. The previous list of features is non-exhaustive and other features may be defined in order to classify blobs as foreground or background conditioned on the main blob. Relative features may comprise average depth difference between a selected blob B with respect to the main blob, spatial location with respect to main blob, etc. In an example, an average three-dimensional position of pixels of a selected blob B may be compared to an average three-dimensional position of pixels of the main blob. If the average three-dimensional position of pixels of the selected blob B corresponds to the average three-dimensional position of pixels of the main blob within a specified tolerance (e.g., 10%, 12%, 5%, etc.), a probability that the blob B corresponds to foreground data may be increased. Similarly, if the average three-dimensional position of pixels of the selected blob B corresponds more closely to the average three-dimensional position of pixels of the main blob relative to other blobs, a probability that the blob B corresponds to foreground data may be increased. In general, for relative features, a level of correspondence between the feature of a selected blob and the same feature in the main blob may be determined. The α probability that pixels of the selected blob are classified as foreground or background depends on the level of correspondence between the feature value for the selected blob and the feature value of the main blob. In various examples, lookup tables may be used to associate various degrees of correspondence with increases or decreases in a probability values. As described in further detail below, a probability values may be used to classify pixels and/or groups of pixels as foreground or background.

Training data may be used to train a random forest-based classifier using 32 trees. Training data may comprise positive and negative samples. In various examples, ≥20,000 positive samples and ≥80,000 negative samples may be used. The preceding example represents one possible set of training data. Any size of training data may be used in accordance with the image segmentation techniques described herein. The classifier may be used to generate a probability estimate for each blob of between 0 and 1, by averaging predictions for all trees. In the classification examples provided above, relatively simple features (e.g., in terms of data size) may be selected depending on the processing power of processor 148 and available memory 150 of image capture device 116. In various examples, low-complexity features may be selected in order to reduce latency and improve classification speed during run time relative to CNN-based approaches In various examples, the segmentation label (e.g., "foreground" or "background") of blobs with a probability estimate near 1 (e.g., ≥0.8, 0.75, 0.83, 0.8667, etc.) may be classified as "foreground" (e.g., encoded with foreground indicator data). Similarly, the segmentation label of blobs with a probability estimate close to 0 (e.g., ≤0.1, 0.2, 0.3, 0.23, 0.167, etc.) may be classified as "background" (e.g., encoded with background indicator data). In various examples, no later inference may be computed for pixels of these labeled blobs. Labeling blobs in accordance with probability values, as described above, may reduce the computational complexity of the image segmentation by reducing the data set for inference computation.

Conditional Classification of Holes

As previously noted, depth holes may span both background and foreground. For example, hair of human subjects may result in depth holes in the depth image. Dark background proximate to dark hair in image data (e.g., depth image data) can result in a depth holes comprising regions of hair that ideally should be labeled as "foreground" as well as "background" regions visible through and around the hair. Accordingly, classification of a depth hole blob as foreground or background is not possible, as depth holes may comprise both background and foreground.

To account for this, each depth hole may be divided into non-overlapping blocks of 32×32 pixels. Each block may be classified separately, again conditioned on the main blob to determine degrees of correspondence between the block (or other portion of pixels) and the main blob. In various examples, lookup tables may be used to associate various degrees of correspondence with increases or decreases in a probability values. As described in further detail below, a probability values may be used to classify pixels and/or groups of pixels as foreground or background. Processor 148 may define features for each depth hole. Examples of depth hole features may comprise spatial location of a depth hole with respect to main blob, location of the depth hole with respect to a detected face or facial region (e.g., detected using a facial recognition algorithm), average color within the block using the color image, etc. Additionally, an integral image may be used to compute the amount of foreground (given by main blob) in all 8 directions of a given block. For example, a 32×32 block of pixels representing hair may have large amount of foreground below the block, but negligible amount above the block. As such, computation of the amount of foreground in the 8 directions surrounding the block using the integral image may provide an effective localization feature for identification of hair. The features described above may be scaled using the average depth value of the main blob to make the features invariant to user distance. A separate random forest based classifier may be used for classifying depth holes. The features selected for classification may vary in different implementations. In the classification examples provided above, relatively simple features (e.g., in terms of data size) may be selected depending on the processing power of processor 148 and available memory 150 of image capture device 116. In various examples, low-complexity features may be selected in order to reduce latency and improve classification speed during run time relative to CNN-based approaches.

Local Probabilities

Processor 148 may compute the probability (data cost) $\Phi_{RGBD}(x)$ for each pixel x using the classifiers discussed above. Segmentation approaches which are only image based typically use learned or pre-defined filters using, e.g., histogram of orientated gradients (HOG) descriptors, and train to select the best set of features. CNN based approaches learn the filters in a supervised manner via backpropagation. The learned filters are then used to define the data cost of each pixel at run-time. However, using depth data may provide advantages in terms of computational complexity and accuracy when determining the probabilities (data cost) of pixels x.

Other Local Cues

Face detection and upper human body detection algorithms, known to those skilled in the art may be used and combined with depth data to provide additional local cues. Within a detected face region, for each pixel x, we define a probability based on the difference between the depth value of the pixel and the average depth value of the main blob. Pixels with very high probabilities (e.g., ≥0.75, 0.8, 0.77, 0.65, 0.9, etc.) may be labeled as foreground.

Hair Prior Segmentation

As discussed, segmentation of hair often poses a challenge for 3D sensors as depth holes are common in regions of image data representing hair. A hair prior segmentation may be used to classify depth holes near the facial region of the subject in the color image based on the distance of such pixels from known foreground pixels. The hair prior segmentation may be performed according to the techniques described herein as:

$$P_{hair}(x) = \exp\left(\frac{-d_{fg}(x)^2}{\sigma^2}\right) \quad (2)$$

where x is a pixel within the face/head ROI, $d_{fg}(x)$ is an input parameter to the $P_{hair}(x)$ equation and represents the distance (in terms of a number of pixels) to the nearest known foreground pixel and a is a weight parameter influencing the fall off (a "fall off parameter"). The distance may be calculated using a fast distance transform. Note that in some examples, the hair prior may only be applied on face/head ROI, which may be defined using the face/upper human body detection algorithms. In examples where face or upper human body detection fails, a head ROI is defined using the top of known foreground (e.g., the top 15%, top 20%, etc. of the known foreground pixels of the main blob). In various examples, the hair prior may only be defined for pixels with no depth values (e.g., depth values equaling zero). Pixels having valid depth values are classified in previous stages (e.g., see Conditional Classification of Valid Depth Blobs, above). Image 504 in FIG. 5 depicts an example image after use of the hair prior described above.

Background Environment Prior

In various examples, image capture device 116 may be used indoors in a home environment. Further, image capture device 116 may be placed in a desired location by a user (e.g., in a user's home, business, or other location) and may build a background model based on that location. In some examples, depth sensor 146 may have difficulty generating valid depth data for far away backgrounds (e.g., beyond 3.5 m, 4 m, 5 m, etc. depending on the particular depth sensor used) and for areas with strong sunlight. Indoor, man-made environments are often characterized by straight lines in the scene (e.g., walls, doorways, ceilings, floors, counters, tables, surfaces, etc.). This fact can be leveraged using a background prior to detect long straight lines in the color image data and label pixels representing such lines as background. Since long, straight lines can also occur in image data on a human subject, the background detection prior may be conditioned on the main blob selection. Accordingly, long straight lines close to the main blob may be ignored (e.g., within k pixels of the main blob, where k is an adjustable design parameter). Let $L(x)$ denote the pixels x corresponding to long straight lines in the scene.

$$P_{BGLines}(x) = 0 d_{fg}(x) > \alpha, \; x \in L(x) \quad (3)$$

where $d_{fg}(x)$ is the distance from the known foreground (e.g., the main blob). Note that the background environment prior is only defined for pixels lying on detected lines.

Additional Depth Prior

The conditional classification of valid depth blobs described above is blob-based and all pixels in the blob are classified with the same value. In addition to such blob-based classification, actual depth values of pixels may be used to handle errors in classification and to have a more continuous prior. In such an additional depth prior, $\mu$ may be the mean depth of the main blob, and $Z(x)$ may be the depth of a particular pixel x. The additional depth prior may be defined as:

$$P_{Depth}(x) = \frac{f(x)}{f(x) + b(x)} \quad (4)$$

where $f(x)$ is the probability of being close to mean foreground depth and $b(x)$ is the probability of being close to background. $f(x)$ and $b(x)$ are defined as:

$$f(x) = \exp\left(-\frac{(z(x) - \mu)^2}{\sigma_2^2}\right)$$

$$b(x) = \max\left(\exp\left(-\frac{(\mu + t - z(x))^2}{\sigma_2^2}\right), \exp\left(-\frac{(\mu - t - z(x))^2}{\sigma_2^2}\right)\right)$$

where t is an offset in mm. Accordingly processor 148 of image capture device 116 may determine whether the pixel depth $Z(x)$ is close to mean depth $\mu$ or away from mean depth $\mu$ based on $\sigma_2$. $\mu+t$ may be used to represent far backgrounds and $\mu-t$ may be used to represent closer depths away from mean depth. The maximum over $(\mu+t)$ and $(\mu-t)$ may be determined for computing $b(x)$. For humans, considering span of humans in depth, reasonable values may be t=800 mm and $\sigma_2$=600 mm, although different values may be used.

In summary, local probabilities of pixels may be obtained using learned classifiers $P_{RGBD}(x)$, hair prior $P_{hair}(x)$, background prior $P_{BGLines}(x)$ and depth prior $P_{Depth}(x)$. $\lambda_1, \lambda_2, \lambda_3$ and $\lambda_4$ may be defined as the weights of $P_{RGBD}(x)$, $P_{hair}(x)$, $P_{BGLines}(x)$, and $P_{depth}(x)$. In various examples, weights $\lambda_1$, $\lambda_2, \lambda_3$ and $\lambda_4$ may be learned and tuned using training data.

Graph Structure

After obtaining foreground/background probabilities for each pixel, the probabilities may be refined using a non-local neighborhood. A graphical model for segmentation may define virtual nodes for foreground and background, respectively. Each pixel is connected to the virtual nodes $\Omega_F$ and $\Omega_B$ based on the pixel's local probability, as previously defined (e.g., $\Phi_{RGBD}(x)$). Each pixel's neighborhood includes K feature-space neighbors, which may be non-local. A non-local neighborhood may be defined using K-nearest neighbors (KNN) for each pixel, as described below.

K-Nearest Neighbors

To define the non-local neighborhood for each pixel, the K-nearest neighbors are found in a feature space. The segmentation is performed on super-pixels (sp) of size S×S, rather than for each pixel to reduce computation cost. For each super-pixel, an 8-dimensional feature vector may be defined based on the super-pixel's average color value for each channel of the color space (e.g., $\mu_L, \mu_A, \mu_B$ in the LAB color space), the standard deviation of color values in each color channel (e.g., $\sigma_L, \sigma_A, \sigma_B$ in the LAB color space), and the centroid of each super-pixel as the super-pixel's spatial location (e.g., ($\beta \times x, \beta \times y$)). Accordingly, an example 8-dimensional feature vector may be $f(sp_i)=(\mu_L, \mu_A, \mu_B, \sigma_L, \sigma_A, \sigma_B, \beta \times x, \beta \times y)$. The spatial features are weighted by $\beta$ to define the influence of the non-local neighborhood. If $\beta=0$, the entire image is used for search for neighbors. Similarly, increasing the weight $\beta$ reduces the search neighborhood. The weight between super-pixels $sp_i$ and $sp_j$ is computed as:

$$W_{KNN}(i, j) = 1 - \frac{\|f(i) - f(j)\|}{K} \quad (5)$$

where $\|\ \|$ denotes the norm of the vector and K is a constant.

Inference

Processor 148 may use a quadratic cost function for inference to infer the segmentation value α(x) for each pixel x.

$$C(x,\alpha)=\sum_{x=1}^{N} W_{fg}(x)(\alpha(x)-1)^2+W_{bg}(x)(\alpha(x)+1)^2+\sum_{u\in N_x} W_{KNN}(\alpha(x)-\alpha(u))^2.$$

$W_{fg}(x)$ represents the combined foreground prior at pixel x, $W_{bg}(x)$ is the combined background prior at pixel x, and $N_x$ denotes the non-local neighborhood of pixel x.

The foreground prior $W_{fg}(x)$ is the weighted combination (using $\lambda_1$, $\lambda_2$, $\lambda_3$ and $\lambda_4$) of learned local priors $P_{RGBD}(x)$, hair prior $P_{hair}(x)$ and depth prior $P_{Depth}(X)$. Similarly, the combined background prior is the weighted combination of background environment cues prior $P_{BGLines}(x)$ and inverse (one minus) of local and depth priors.

Solver

Processor 148 may calculate the derivative of the cost function C(x,α) for each pixel to generate a linear system of equations. If the neighborhood size is K, the linear system may be sparse as each pixel interacts with K pixels. Processor 148 may solve the sparse system using standard linear system libraries. For example, the sparse solver (LDLT) in the EIGEN C++ library may be used by processor 148 to solve the system.

In various examples, the linear system may be simplified in order to avoid solving for each pixel and/or for each super-pixel. For example, processor 148 may solve the linear system only for those pixels that are not classified as foreground or background in previous processing stages. For example, all pixels of the main blob have been previously classified as foreground. Pixels with very high confidence from classifiers can be set to foreground/background. For example, pixels with α(x)≥0.8 may be classified as foreground (e.g., encoded with foreground indicator data) and pixels with α(x)≤0.2 may be classified as background (e.g., encoded with background indicator data). Processor 148 may be programmed to remove such pixels from the system in accordance with the techniques described below.

Given a final linear system over all pixels may be Ax=b. x may be written as:

$$x = \begin{bmatrix} x_{known} \\ x_{unknown} \end{bmatrix}$$

where $x_{known}$ denotes known pixels and $x_{unknown}$ denotes unknown pixels. Accordingly, $$\begin{bmatrix} A_{11} & A_{12} \\ A_{21} & A_{22} \end{bmatrix}\begin{bmatrix} x_{known} \\ x_{unknown} \end{bmatrix} = \begin{bmatrix} b_{known} \\ b_{unknown} \end{bmatrix}$$

Processor 148 may determine the unknown values by removing the contribution of known pixels from the system:

$$A_{22}X_{unknown}=b_{unknown}-A_{21}X_{known}$$

In an example, a 5 MP RGB image may comprise from a few thousand to 30,000 unknowns.

Multi-Resolution Processing

To reduce the latency of the solver, multi-resolution processing may be employed. The system may initially be solved at a coarse resolution (e.g., using larger super-pixels). Subsequently, the solution from the coarse resolution solver may be used as an initial guess for finer resolutions. For example, an initial super-pixel size of 16×16 pixels may be used to generate a coarse solution. The solution from the course resolution may be refined at a 4×4 super-pixel size. An adaptive super-pixel size may be used to ensure that the number of unknowns remains below a predetermined level (e.g., 15,000).

Processor 148 may employ border matting and/or border smoothing to refine the borders of the final segmentation. For example, Gaussian filtering and/or interpolation may be used to smooth the edges of the segmented subject. In various examples, a Gaussian filter may use a Gaussian function to calculate the transformation to a apply to each pixel to be blurred. The Gaussian blur may reduce the visual clarity of high frequency components of pixel values and may result in borders that appear more smooth to a human viewer.

Rendering of Output Image

In some examples, a small area surrounding the feet of a subject may be assigned as foreground to avoid segmenting out (e.g., labeling as background) the feet of the subject. For example, two-dimensional image data of the subject's feet may be identified in the RGB image data and may be projected onto the ground plane to avoid cutting off the subject's feet in the segmented image data (e.g., the image data encoded as foreground after segmentation). In some examples, RANSAC may be used to identify a set of pixels of the depth image data corresponding to a floor in the depth image data. Color image data corresponding to the foreground image data of the main blob may be projected onto the identified floor image data. In some examples, a threshold percentage of the color image data may be projected (e.g., the lower 20% of the color image data corresponding to the main blob may be projected onto the floor). Otherwise, the feet may be cut out of the segmented image as the depth values of the subject's feet may differ significantly from the remainder of the subject's body (at least for a standing human subject). Additionally, a small quadrilateral or other-shaped region of RGB image data surrounding the subject's feet may be assigned as foreground to avoid giving the impression of a "floating" subject in the segmented image. Further, in some examples, the background may be blurred to generate the final visual output shown to the user on a display, instead of showing the segmentation on a white background. Blurring the background may result in a visually pleasing image and may bring focus and attention to the subject (e.g., the user and/or clothing items), while reducing visual attention on background clutter.

Figure 6:
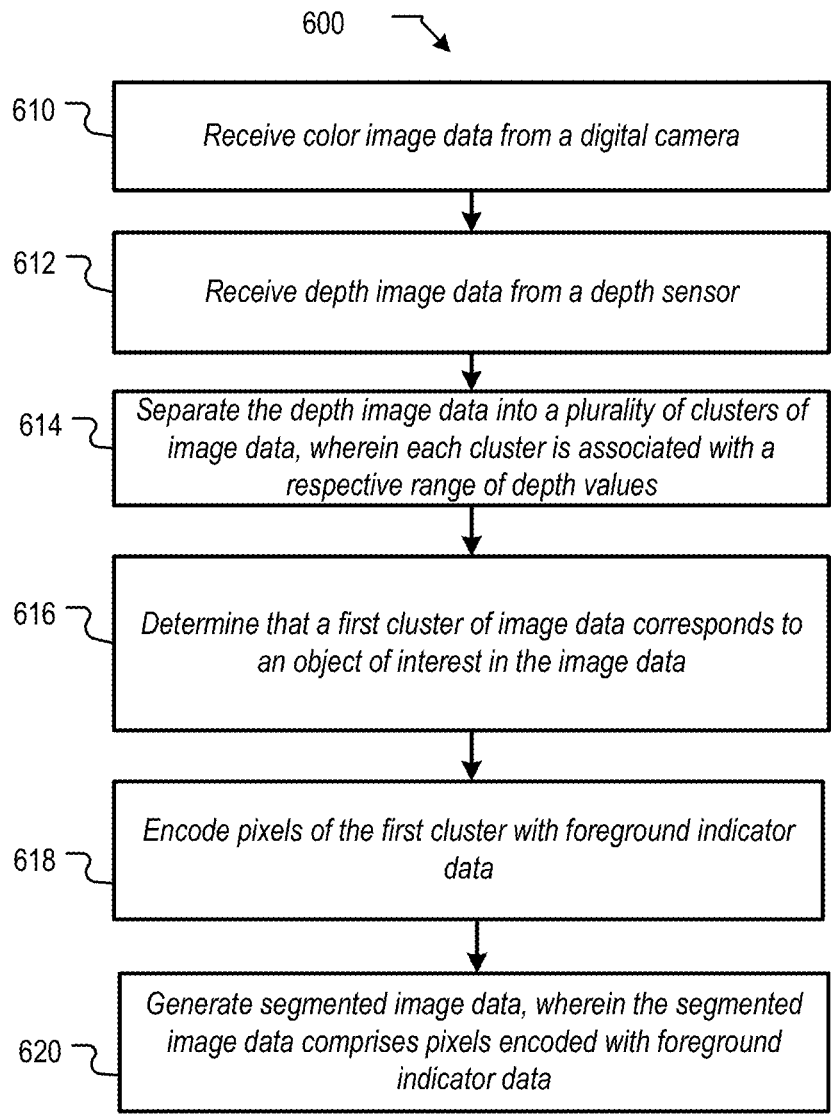
FIG. 6 depicts a flow chart showing an example process for segmenting image data, in accordance with various aspects of the present disclosure.

FIG. 6 is a flow chart showing an example process for segmenting image data from background image data, in accordance with various aspects of the present disclosure. The process flow 600 of FIG. 6 may be executed by image capture device 116, by a combination of image capture device 116 and a computing device configured to be in communication with image capture device 116, and/or by one or more computing devices configured to be in communication with image capture device 116, in accordance with various aspects of the present disclosure. The actions of process flow 600 may represent a series of instructions comprising computer-readable machine code executable by a processing unit of a computing device or of image capture device 116. In various examples, the computer-readable machine code may be comprised of instructions selected from a native instruction set of the computing device and/or an operating system of the computing device. Various actions in process flow 600 may be described with reference to elements of FIGS. 1-5.

At action 610 of process flow 600, a processor of image capture device 116 or another computing device may receive color image data from a digital camera. As described above, in at least some examples, the digital camera may be a digital camera of image capture device 116. Color image data may comprise a frame of pixels comprising a color value for each pixel.

Processing may continue from action 610 to action 612, "Receive depth image data from a depth sensor." At action 612, depth image data may be received from a depth sensor, such as depth sensor 146 depicted in FIG. 1B. Depth image data may be, for example, a frame of pixels where each pixel is associated with a respective depth value. The depth value of a particular pixel may be representative of a distance between the IR sensor of the depth sensor and the portion of the environment represented by the pixel.

Processing may continue from action 612 to action 614, "Separate the depth image data into a plurality of clusters of image data, wherein each cluster is associated with a respective range of depth values." In various examples, the depth image may be initially denoised using a median frequency filter (e.g., a Gaussian filter). Thereafter, small holes (e.g., pixels and/or groups of pixels without valid depth data) may be filled using interpolation techniques, as described previously. The ground plane of the environment represented by the depth image may be located using a RANSAC algorithm, according to techniques known to those of ordinary skill in the art. Pixels representing the ground plane (sometime referred to as the "floor") may be removed from the depth image data. A connected component analysis may be executed on the remaining depth data to over-segment the depth data into clusters. Pixels of a cluster may include depth values that are within a range of depth values associated with the particular cluster. Accordingly, forming the clusters quantizes the pixels of the depth image into various ranges of depth values, reducing the dimensionality of the segmentation problem.

Processing may continue from action 614 to action 616: "Determine that a first cluster of image data corresponds to an object of interest in the image data." At action 616, a main blob or cluster may be selected from the plurality of clusters generated during step 614. In some examples, the main cluster (and/or pixels of the main cluster) may correspond to image data representing a human subject. Various techniques described herein may be used to identify the main cluster. An example process for identifying the main cluster is described in FIG. 7. In addition, other techniques for identifying the main cluster are described above.

Processing may continue from action 616 to action 618: "Encode pixels of the first cluster with foreground indicator data." At action 618, pixels of the main cluster may be encoded with foreground indicator data, effectively labeling the pixels of the main cluster as foreground data that should be segmented from image data labeled as "background". In some examples, each pixel of the main cluster may be encoded to include foreground indicator data. In some other examples, data representing the cluster may be encoded with foreground indicator data effectively labeling each pixel of the cluster as "foreground". In various examples, foreground indicator data may include one or more bits in the data representing pixels of the main cluster and/or the main cluster itself. Such bits may be regarded as a flag or other indicator and may denote whether the particular image data is classified as foreground or background.

Processing may continue from action 618 to action 620, "Generate segmented image data, wherein the segmented image data comprises pixels encoded with foreground indicator data." At action 620, segmented image data may be generated. The segmented image data may comprise pixels that include foreground indicator data. In at least some examples, pixels that include background indicator data (e.g., those pixels that have been labeled as "background") may not be included in the segmented image.

Figure 7:
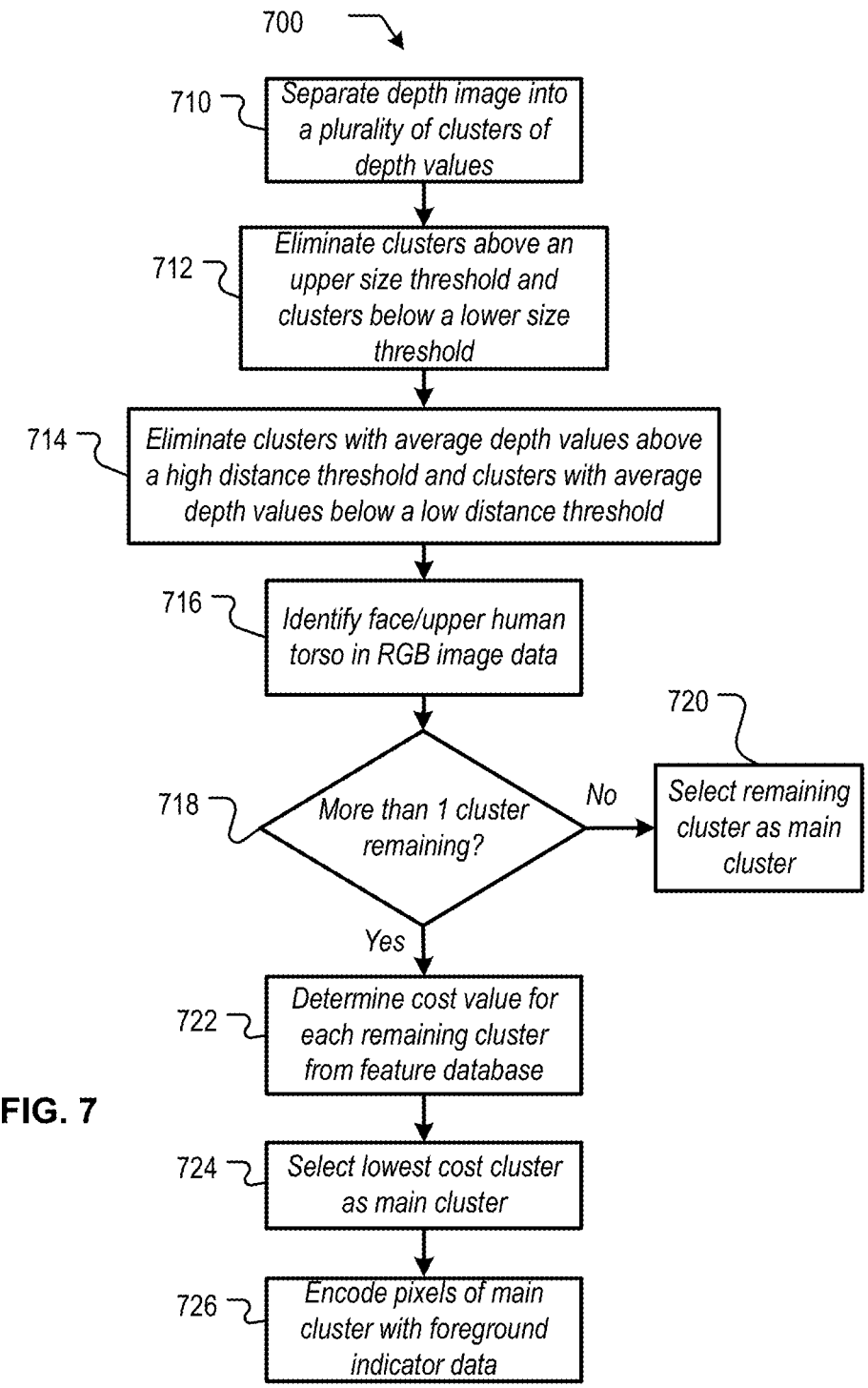
FIG. 7 depicts a flow chart showing an example process for selecting a main cluster of depth image data from among a plurality of clusters of depth image data, wherein the main cluster corresponds to an object of interest represented by the depth data, in accordance with various aspects of the present disclosure.

FIG. 7 is a flow chart showing an example process for selecting a main cluster of depth image data from among a plurality of clusters of depth image data, wherein the main cluster corresponds to an object of interest in the depth data, in accordance with various aspects of the present disclosure. The process flow 700 of FIG. 7 may be executed by image capture device 116, by a combination of image capture device 116 and a computing device configured to be in communication with image capture device 116, and/or by one or more computing devices configured to be in communication with image capture device 116, in accordance with various aspects of the present disclosure. The actions of process flow 700 may represent a series of instructions comprising computer-readable machine code executable by a processing unit of a computing device or of image capture device 116 (or of some combination thereof). In various examples, the computer-readable machine code may be comprised of instructions selected from a native instruction set of the computing device and/or an operating system of the computing device. Various actions in process flow 700 may be described with reference to elements of FIGS. 1-6. At least some of the actions in the process flow 700 may be optional depending on the desired implementation.

Processing of process flow 700 may begin at action 710 "Separate depth image into a plurality of clusters of depth values." At action 710, the depth image may be separated into a plurality of clusters of depth values. Each cluster of the plurality of clusters may correspond to a respective range of depth values. In some examples, an average depth value may be determined for each cluster by averaging the depth values of each pixel within a particular cluster for which the average depth value is being determined.

Processing may continue from action 710 to action 712: "Eliminate clusters above an upper size threshold and clusters below a lower size threshold." At action 712, the size of each cluster (e.g., the cluster's dimensions and/or area) may be compared to an upper size threshold and a lower size threshold. Clusters with sizes (e.g., areas and/or dimensions depending on the desired implementation) greater than the upper size threshold or less than the lower size threshold may be excluded from a candidate set of main clusters.

Processing may continue from action 712 to action 714: "Eliminate clusters with average depth values above a high distance threshold and clusters with average depth values below a low distance threshold." At action 714, the average depth value of each remaining cluster may be compared to a high distance threshold and a low distance threshold. Clusters with averaged depth values exceeding the high distance threshold or lower than the low distance threshold may be excluded from the candidate set of main clusters.

Processing may proceed from action 714 to action 716: "Identify face/upper human torso in RGB image data." In various examples, human facial recognition algorithms and/or upper human torso detection algorithms may be used to determine whether or not one or more human faces and/or torsos appears in the depth image data. In at least some examples, clusters that do not include at least one human face and/or at least one human torso may be excluded from the candidate set of main clusters. In some other examples, if no human faces and/or torsos are detected at action 716, no clusters may be excluded from the candidate set of main clusters.

Processing may proceed from action 716 to action 718 at which a determination is made whether or not more than one cluster remains in the set of candidate clusters. If only one cluster remains, processing may proceed from action 718 to action 720 at which the sole remaining cluster may be selected as the main cluster. However, if more than one cluster remains in the set of candidate clusters processing may proceed from action 718 to action 722: "Determine cost value for each remaining cluster from feature database."

Training data may be used to derive shape features (e.g., Hu moments, central moments) for positive and negative user/subject blobs. Derived shape features may be stored in a database in memory 150. At action 722, K nearest neighbors within the feature database may be determined for each cluster. The average distance between each cluster and the shape feature is computed in the feature space. A cost function combining the distance of shape features and weighted intrinsic features is generated. Weights in the feature space may be tuned using available training data.

Processing may proceed from action 722 to action 724: "Select lowest cost cluster as main cluster." At action 724 the cluster/blob among the set of candidate clusters with the lowest cost may be selected as the main blob/cluster.

Processing may proceed from action 724 to action 726: "Encode pixels of main cluster with foreground indicator data." At action 726 the pixels of the main cluster may be encoded with foreground indicator data. For example, the $\alpha(x)$ value for each pixel of the main cluster may be set to a value of "1", denoting that the pixels are "definite foreground" and should be rendered as a part of the segmented image.

Among other potential benefits, a system in accordance with the present disclosure may allow image data representing a human or other object of interest to be segmented from other image data. Depth domain data may be used to identify a main blob of image data. Classifiers may be trained to classify the remaining blobs (e.g., "non-main blobs") as "foreground" or "background" based on both intrinsic and relative features of the remaining blob image data. Additionally, training data may be used to classify the remaining, non-main blobs. Similarly, depth holes (e.g., portions of image data for which no depth data is generated by the depth sensor) may be classified according to the various techniques described herein. Using depth domain data to perform image segmentation as described in the current disclosure may allow for low-latency, high quality segmentation of image data, even when processing and/or memory resources are limited. Additionally, using depth data as opposed to image-based approaches for segmentation may provide advantages in terms of computational complexity and accuracy when determining the probabilities (data cost) of individual pixels being either foreground pixels (e.g., part of the human or other object of interest) or background pixels (e.g., not part of the human or other object of interest). Various priors described above may be used to account for situations where depth data is limited. For example, a hair prior may define hair pixels as foreground even though hair is difficult to detect using a depth sensor. Additionally, a background prior may be used to detect environmental background cues that are otherwise difficult to discern using a depth sensor (e.g., in images with bright sunlight, incandescent lighting).

Finally, in various examples, a small area surrounding the feet of a human subject may be detected and labeled as foreground to avoid segmenting out the feet of a human subject and giving a "floating" appearance.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for segmenting human image data from background image data, the method comprising:
    generating color image data representing a human in an environment using a digital camera;
    generating depth data representing the human in the environment using a depth sensor;
    separating the depth data into a plurality of clusters of depth data, wherein each cluster of the plurality of clusters is associated with a respective range of depth values;
    determining a first cluster from the plurality of clusters, wherein the first cluster comprises depth data at least partially corresponding to the human;
    encoding pixels in the first cluster with foreground indicator data to classify the pixels in the first cluster as foreground;
    determining a first average three-dimensional position of the pixels of the first cluster;
    determining a second average three-dimensional position of pixels of a second cluster from the plurality of clusters;
    determining that the first average three-dimensional position corresponds more closely to the second average three-dimensional position relative to other clusters of the plurality of clusters;
    determining that the second cluster at least partially corresponds to the human;
    encoding the pixels of the second cluster with the foreground indicator data to classify the pixels of the second cluster as foreground;
    associating a first pixel of the depth data with a second pixel of the color image data;
    identifying a first portion of the color image data for which no corresponding depth information is available in the depth data;
    determining a first average color value of the first portion of the color image data;
    determining a second average color value of a second portion of pixels, wherein the second portion of pixels correspond to pixels of the first cluster in the depth data;
    determining that the first average color value corresponds more closely to the second average color value relative to other portions of the color image data;
    determining that the first portion of the color image data at least partially corresponds to the human;
    encoding pixels of the first portion of the color image data for which no depth information is available with the foreground indicator data to classify the pixels of the first portion as foreground; and
    generating a segmentation mask, wherein the segmentation mask comprises one or more first pixels classified as foreground and one or more second pixels classified as background.

2. The method of claim 1, further comprising:
    identifying floor image data in the depth data using a RANSAC algorithm, wherein the floor image data represents a floor of the environment on which the human is standing; and
    separating the depth data, excluding pixels corresponding to the floor image data, into the plurality of clusters of depth data.

3. The method of claim 1, further comprising:
    determining a first region of the color image data corresponding to a face of the human;
    determining a region of interest in the color image data, wherein the region of interest comprises a band of image data around the first region;
    identifying a third pixel of the color image within the region of interest, wherein no corresponding depth information is available for the third pixel in the depth data;
    determining a distance, in terms of a number of pixels, between the third pixel and a closest pixel encoded with foreground indicator data;
    determining a probability that the third pixel corresponds to hair of the human based on the number of pixels between the third pixel and the closest pixel and a weight parameter; and
    classifying the third pixel as foreground based on the probability being greater than 0.8 by encoding the third pixel with the foreground indicator data.

4. An image segmentation method comprising:
    receiving color image data;
    receiving depth image data;
    separating the depth image data into a plurality of clusters of depth image data, wherein each cluster is associated with a respective range of depth values;
    determining that a first cluster of depth image data corresponds to an object of interest;
    encoding pixels of the first cluster with foreground indicator data;
    associating a first pixel of the depth image data with a corresponding second pixel of the color image data;
    determining that a third pixel of the depth image data corresponds to the object of interest based at least in part on the color image data;
    encoding the third pixel of the depth image data with the foreground indicator data; and
    generating first image data, wherein the first image data comprises a first set of pixels of the color image data encoded with the foreground indicator data and a second set of pixels of the color image data encoded with background indicator data.

5. The method of claim 4, further comprising:
    identifying a second cluster of the plurality of clusters, wherein the second cluster of depth image data has an average pixel depth value indicating an average distance between a portion of an environment represented by the second cluster and a depth sensor;
    determining that the average distance exceeds a threshold distance; and
    encoding pixels of the second cluster with the background indicator data.

6. The method of claim 4, further comprising:
    detecting second image data in the color image data, wherein the second image data represents a face; and determining that the second image data in the color image
data corresponds to a portion of pixels of the first
cluster in the depth image data, wherein determining
that the first cluster of depth image data corresponds to
the object of interest is based at least in part on
determining that the second image data in the color
image data corresponds to the portion of the pixels of
the first cluster.

7. The method of claim 4, further comprising:
determining a first average depth value of the pixels of the
first cluster;
identifying a second cluster of the plurality of clusters;
determining a second average depth value of pixels of the
second cluster;
comparing the first average depth value to the second
average depth value; and
encoding the pixels of the second cluster with foreground
indicator data based at least in part on a level of
correspondence between the first average depth value
and the second average depth value.

8. The method of claim 4, further comprising:
identifying a second cluster of the plurality of clusters,
wherein no depth data is associated with pixels of the
second cluster;
separating the second cluster into one or more blocks of
pixels;
determining a feature value of a first block of the one or
more blocks of pixels;
comparing the feature value of the first block of the one
or more blocks of pixels to a corresponding feature
value of the pixels of the first cluster; and
encoding pixels of the first block with the foreground
indicator data based at least in part upon a level of
correspondence between the feature value of the first
block and the corresponding feature value of the pixels
of the first cluster.

9. The method of claim 4, further comprising:
determining a first region of the color image data, wherein
the color image data of the first region represents a face;
determining a second region of interest in the color image
data, wherein the second region of interest surrounds
the first region;
identifying a fourth pixel of the color image within the
second region of interest, wherein no corresponding
depth information is available for the fourth pixel in the
depth data;
determining a distance, in terms of a number of pixels,
between the fourth pixel and a closest fifth pixel
encoded with foreground indicator data;
determining that the fourth pixel is a foreground pixel
using the distance as an input parameter to a hair prior
equation; and
encoding the fourth pixel with the foreground indicator
data.

10. The method of claim 4, further comprising:
identifying a number of pixels aligned along an axis in the
color image data;
determining that the number of pixels exceeds a threshold
length value; and
encoding the pixels aligned along the axis with the
background indicator data based at least in part on the
number of pixels aligned along the axis exceeding the
threshold length value.

11. The method of claim 4, further comprising:
identifying floor plane depth image data in the depth
image data;

determining a portion of the color image data correspond-
ing to a lower portion of the first cluster of depth image
data, wherein the portion of the color image data
represents feet of a human subject; and
encoding the portion of the color image data and a region
of the floor plane depth image data surrounding the
portion of the color image data with the foreground
indicator data.

12. An image capture device comprising:
a digital camera effective to capture color image data;
a depth sensor effective to capture depth image data;
at least one processor in communication with the digital
camera and the depth sensor, the at least one processor
effective to execute instructions that when executed by
the at least one processor cause the image capture
device to perform a method comprising:
separating the depth image data into a plurality of
clusters of depth image data, wherein each cluster is
associated with a respective range of depth values;
associating a first pixel of the depth image data with a
corresponding second pixel of the color image data;
determining that a first cluster of depth image data
corresponds to an object of interest;
encoding pixels of the first cluster with foreground
indicator data;
determining that a third pixel of the depth image data
corresponds to the object of interest based at least in
part on the color image data;
encoding the third pixel of the depth image data with
the foreground indicator data; and
generating first image data, wherein the first image data
comprises a first set of pixels of the color image data
encoded with the foreground indicator data and a
second set of pixels of the color image data encoded
with background indicator data.

13. The image capture device of claim 12, wherein the
instructions when executed by the at least one processor are
further effective to cause the image capture device to per-
form the method further comprising:
identifying a second cluster of the plurality of clusters,
wherein the second cluster of depth image data has an
average pixel depth value indicating an average dis-
tance between a portion of an environment represented
by the second cluster and the depth sensor;
determining that the average distance exceeds a threshold
distance; and
encoding pixels of the second cluster with the background
indicator data.

14. The image capture device of claim 12, wherein the
instructions when executed by the at least one processor are
further effective to cause the image capture device to per-
form the method further comprising:
detecting second image data in the color image data,
wherein the second image data represents a face; and
determining that the second image data in the color image
data corresponds to a portion of pixels of the first
cluster in the depth image data, wherein determining
that the first cluster of depth image data corresponds to
the object of interest is based at least in part on
determining that the second image data in the color
image data corresponds to the portion of the pixels of
the first cluster.

15. The image capture device of claim 14, wherein the
instructions when executed by the at least one processor are
further effective to cause the image capture device to per-
form the method further comprising:

determining a first average depth value of the pixels of the first cluster;
identifying a second cluster of the plurality of clusters;
determining a second average depth value of pixels of the second cluster;
comparing the first average depth value to the second average depth value; and
encoding the pixels of the second cluster with foreground indicator data based at least in part on a level of correspondence between the first average depth value and the second average depth value.

16. The image capture device of claim 12, wherein the instructions when executed by the at least one processor are further effective to cause the image capture device to perform the method further comprising:
identifying a second cluster of the plurality of clusters, wherein no depth data is associated with pixels of the second cluster;
separating the second cluster into one or more blocks of pixels;
determining a feature value of a first block of the one or more blocks of pixels;
comparing the feature value of the first block of the one or more blocks of pixels to a corresponding feature value of the pixels of the first cluster; and
encoding pixels of the first block with the foreground indicator data, based at least in part upon a level of correspondence between the feature value of the first block and the corresponding feature value of the pixels of the first cluster.

17. The image capture device of claim 12, wherein the instructions when executed by the at least one processor are further effective to cause the image capture device to perform the method further comprising:
determining a first region of the color image data;
determining a second region of interest in the color image data, wherein the second region of interest surrounds the first region;
identifying a fourth pixel of the color image within the second region of interest, wherein no corresponding depth information is available for the fourth pixel in the depth data;
determining a distance, in terms of a number of pixels, between the fourth pixel and a closest fifth pixel encoded with foreground indicator data;
determining that the fourth pixel is a foreground pixel using the distance as an input parameter to a hair prior equation; and
encoding the fourth pixel with the foreground indicator data.

18. The image capture device of claim 12, wherein the instructions when executed by the at least one processor are further effective to cause the image capture device to perform the method further comprising:
identifying a number of pixels aligned along an axis in the color image data;
determining that the number of pixels exceeds a threshold length value; and
encoding the pixels aligned along the axis with the background indicator data based at least in part on the number of pixels aligned along the axis exceeding the threshold length value.

19. The image capture device of claim 12,
wherein the instructions when executed by the at least one processor are further effective to cause the image capture device to perform the method further comprising:
generating a model of image data encoded with the background indicator data;
storing the model in a memory;
comparing the color image data to the model; and
encoding a portion of the color image data with the background indicator data based at least in part upon a level of correspondence between the color image data and the model.

20. The image capture device of claim 12, wherein the instructions when executed by the at least one processor are further effective to cause the image capture device to perform the method further comprising:
identifying a set of pixels of the depth image data corresponding to a floor plane in a scene in which a human is standing;
determining a portion of the color image data corresponding to a lower portion of the first cluster of depth image data, wherein the portion of the color image data comprises a representation of feet of a human subject; and
encoding the portion of the color image data and a region of the set of pixels of the depth image data corresponding to the floor plane surrounding the portion of the color image data with the foreground indicator data.

* * * * *